United States Patent
Machida et al.

(10) Patent No.: US 11,872,499 B2
(45) Date of Patent: Jan. 16, 2024

(54) WEARING MEMBER

(71) Applicant: SONY INTERACTIVE ENTERTAINMENT INC., Tokyo (JP)

(72) Inventors: Yuuichi Machida, Kanagawa (JP); Kunihito Sawai, Kanagawa (JP)

(73) Assignee: SONY INTERACTIVE ENTERTAINMENT INC., Tokyo (JP)

(*) Notice: Subject to any disclaimer, the term of this patent is extended or adjusted under 35 U.S.C. 154(b) by 325 days.

(21) Appl. No.: 17/427,147

(22) PCT Filed: Feb. 8, 2019

(86) PCT No.: PCT/JP2019/004757
§ 371 (c)(1),
(2) Date: Jul. 30, 2021

(87) PCT Pub. No.: WO2020/161920
PCT Pub. Date: Aug. 13, 2020

(65) Prior Publication Data
US 2022/0096943 A1 Mar. 31, 2022

(51) Int. Cl.
*A63F 13/98* (2014.01)
*A45F 5/00* (2006.01)
(Continued)

(52) U.S. Cl.
CPC .............. *A63F 13/98* (2014.09); *A45F 5/004* (2013.01); *A63F 13/24* (2014.09); *F16M 13/04* (2013.01); *G06F 3/014* (2013.01)

(58) Field of Classification Search
CPC .......... A63F 13/98; A63F 13/24; A45F 5/004; F16M 13/04; G06F 3/014
See application file for complete search history.

(56) References Cited

U.S. PATENT DOCUMENTS 11,596,858 B2 * 3/2023 Yamano ................ G06F 3/0346
2009/0131171 A1 5/2009 Miyazaki
(Continued)

FOREIGN PATENT DOCUMENTS

JP 3162897 U 9/2010
JP 3178049 U 8/2012
(Continued)

OTHER PUBLICATIONS

International Search Report and Written Opinion dated Apr. 23, 2019, from PCT/JP2019/004757, 8 sheets.
(Continued)

*Primary Examiner* — Brian D Nash
(74) *Attorney, Agent, or Firm* — XSENSUS LLP

(57) ABSTRACT

A wearing member (2) includes a support member (31) extending in a first direction, a belt (34) extending from a site in the first direction of the support member (31), a sliding member (33) which is connected to one end of the belt (34) and which slides in the first direction along the support member (31), and a locking section which is provided in a direction opposite to the first direction in relation to the support member (31) and which locks a site on the other end side of the belt (34). In a state in which the belt (34) is locked by the locking section, a space (SP) surrounded by the support member (31) and the belt (34) is formed, and a part of the sliding member (33) is disposed inside the space (SP).

10 Claims, 27 Drawing Sheets

(51) Int. Cl.
*A63F 13/24* (2014.01)
*F16M 13/04* (2006.01)
*G06F 3/01* (2006.01)

(56) References Cited

U.S. PATENT DOCUMENTS

| | | | |
|---|---|---|---|
| 2011/0263328 A1* | 10/2011 | Yamashita | A63F 13/24 |
| | | | 463/36 |
| 2013/0059696 A1* | 3/2013 | Hijmans | A63B 23/03525 |
| | | | 482/8 |
| 2013/0207890 A1* | 8/2013 | Young | G06F 3/014 |
| | | | 345/156 |
| 2014/0191095 A1 | 7/2014 | Le Gette et al. | |
| 2016/0342218 A1* | 11/2016 | Burba | G06F 3/0338 |
| 2017/0235364 A1* | 8/2017 | Nakamura | G06F 3/016 |
| | | | 345/156 |
| 2017/0318788 A1* | 11/2017 | Blaylock | A45F 5/004 |
| 2018/0104576 A1* | 4/2018 | Hope | A63F 13/218 |
| 2018/0264357 A1* | 9/2018 | Dalton | G06F 3/011 |
| 2018/0272232 A1* | 9/2018 | Campbell | G06F 3/038 |
| 2019/0009172 A1* | 1/2019 | Sawai | G06F 3/038 |
| 2019/0025916 A1* | 1/2019 | Okumura | G06F 3/01 |
| 2019/0038968 A1* | 2/2019 | Machida | A63F 13/42 |
| 2019/0041999 A1* | 2/2019 | Hirata | A63F 13/26 |
| 2020/0246691 A1* | 8/2020 | Petersen | A63F 13/24 |
| 2021/0337056 A1* | 10/2021 | Smith | G06F 1/1626 |
| 2023/0244312 A1* | 8/2023 | Sawai | G06F 3/01 |
| | | | 345/156 |

FOREIGN PATENT DOCUMENTS

| | | |
|---|---|---|
| JP | 2014-228060 A | 12/2014 |
| WO | 2010/147438 A2 | 12/2010 |
| WO | 2017/149888 A1 | 9/2017 |
| WO | 2017/221432 A1 | 12/2017 |

OTHER PUBLICATIONS

International Preliminary Report on Patentability dated Aug. 19, 2021, from PCT/JP2019/004757, 11 sheets including translation.

* cited by examiner

FIG.12
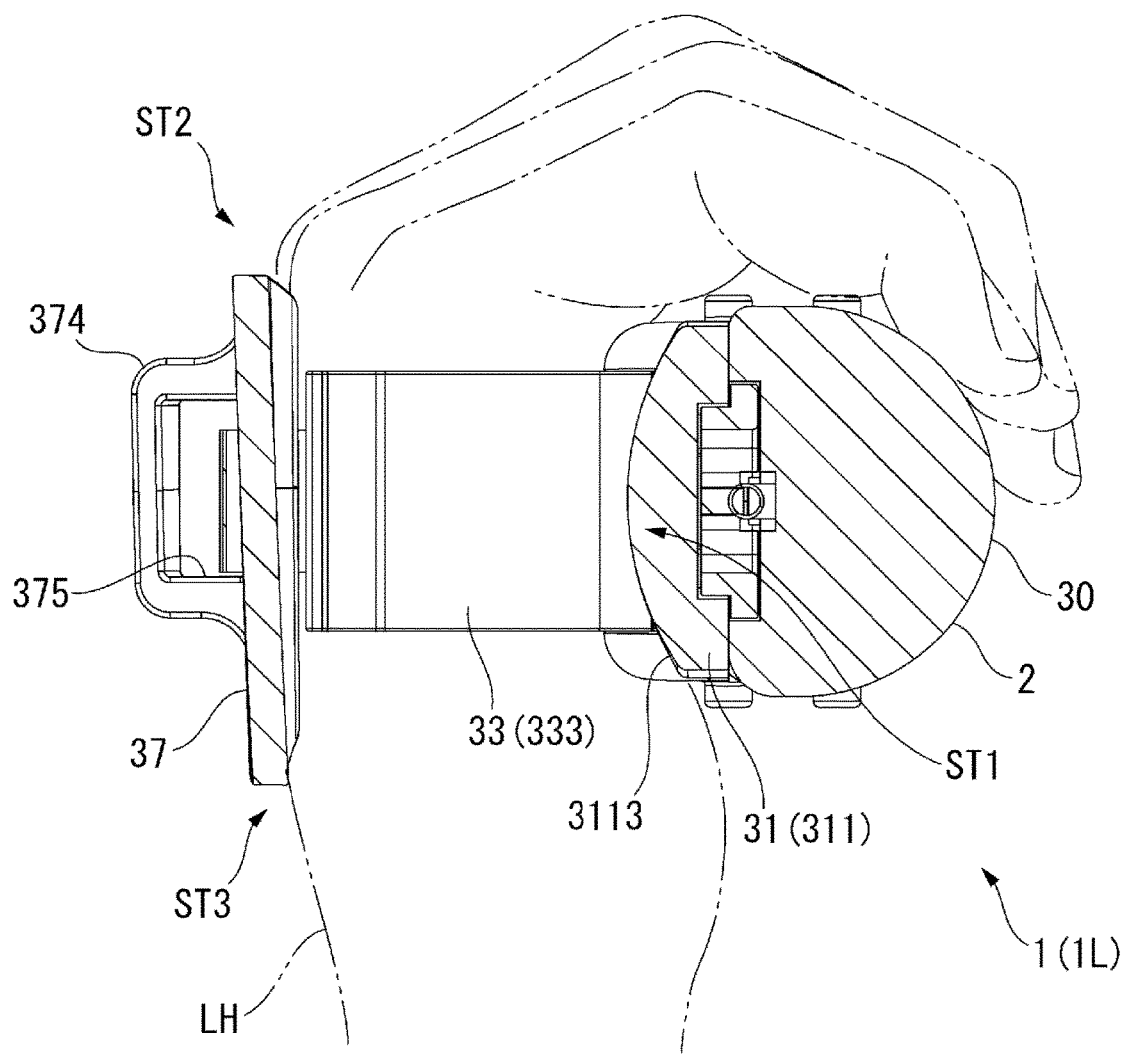
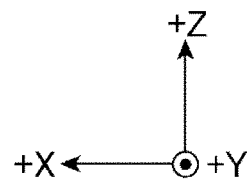

WEARING MEMBER

TECHNICAL FIELD

The present invention relates to a wearing member.

BACKGROUND ART

In the past, an operation device that is connected to an information processing device such as a PC (Personal Computer) or a game device and that transmits an operation signal to the information processing device has been known (see, for example, PTL 1).

A controller (operation device) described in PTL 1 has a left-side grasping section and a right-side grasping section which are grasped by left and right hands of a user, and direction buttons and operation buttons arranged on a front side of the controller.

CITATION LIST

Patent Literature

[PTL 1]
U.S. Patent Application Publication No. 2009/0131171

SUMMARY

Technical Problem

Incidentally, the controller worn on one hand of the user has a problem that it is difficult to perform operations by the controller if the controller is not worn stably on the one hand.

Therefore, there has been a demand for a controller which can be worn stably on one hand.

The present invention is aimed at solving at least part of the above-mentioned problem, and it is one of the objects to provide a wearing member that can be worn stably.

Solution to Problem

A wearing member according to one mode of the present invention includes a support member that extends in a first direction, a belt that extends from a site in the first direction of the support member, a sliding member that is connected to one end of the belt and slides in the first direction along the support member, and a locking section that is provided in a direction opposite to the first direction in relation to the support member and locks a site on the other end side of the belt. In a state in which the belt is locked by the locking section, a space surrounded by the support member and the belt is formed, and a part of the sliding member is disposed inside the space.

BRIEF DESCRIPTION OF DRAWINGS

FIG. 12 is a perspective view depicting the wearing member in the first embodiment.

DESCRIPTION OF EMBODIMENTS

First Embodiment

A first embodiment of the present invention will be described below based on the drawings.

Figure 1:
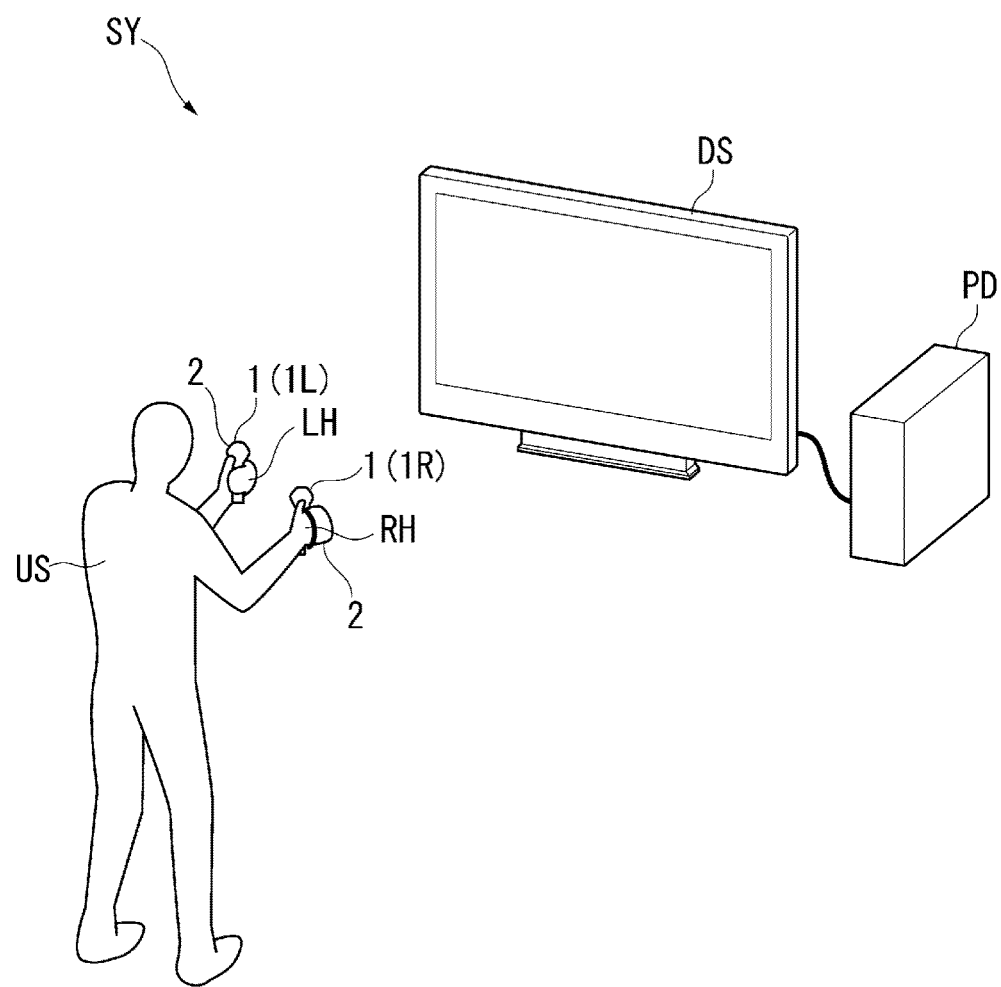
FIG. 1 is a schematic diagram depicting an information processing system in a first embodiment.

(General Configuration of Information Processing System) FIG. 1 is a schematic diagram depicting an information processing system SY according to the present embodiment. The information processing system SY includes an information processing device PD such as a game machine or a PC, an image display device DS, and at least one operation device 1.

The information processing device PD receives operation information transmitted from the operation device 1 by a predetermined communication system. The information processing device PD executes processing such as a game based on the operation information received and transmits the results of processing to the image display device DS. The image display device DS displays the results of processing transmitted from the information processing device PD.

(Configuration of Operation Device)

Figure 2:
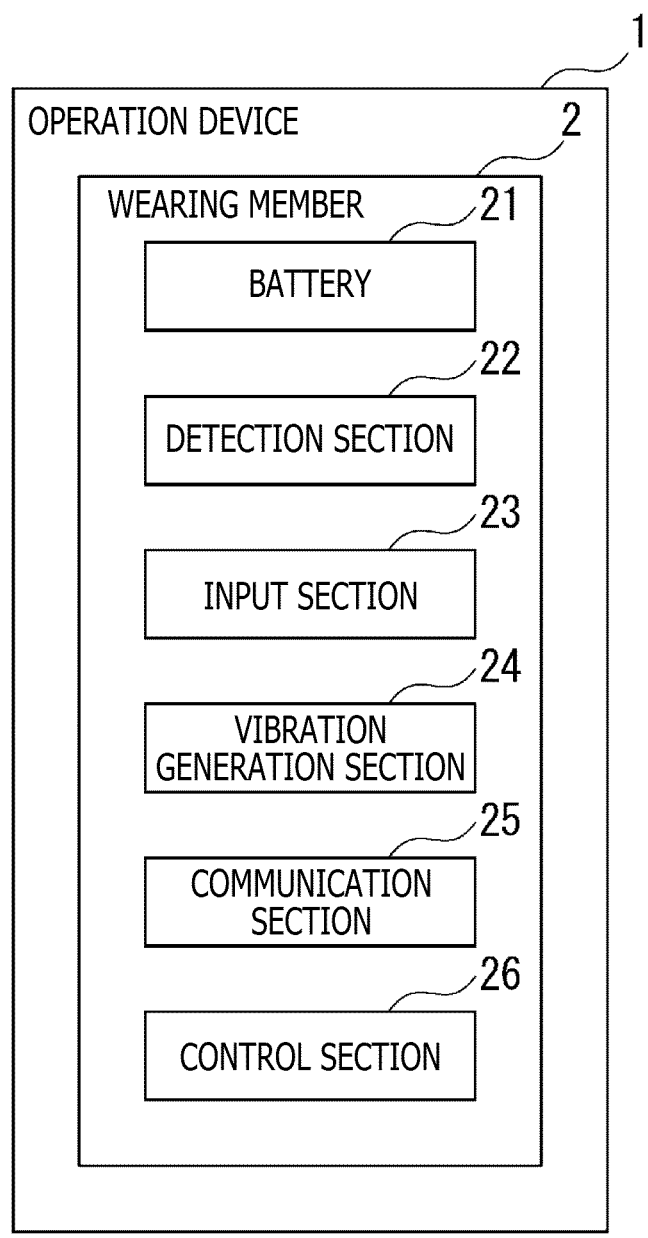
FIG. 2 is a block diagram depicting a configuration of an operation device in the first embodiment.

FIG. 2 is a block diagram depicting a configuration of the operation device 1.

The operation device 1 is worn on one hand of a user US and transmits operation information according to an operation of the user US on a wireless basis. The operation device 1 includes an operation device 1L worn on a left hand LH of the user US, and an operation device 1R worn on a right hand RH. Note that the operation device 1 may not necessarily include the operation devices 1L and 1R, but may include one operation device of the operation devices 1L and 1R.

Such an operation device 1 includes a wearing member 2 worn on one hand of the user US, and, as depicted in FIG. 2, includes a battery 21, a detection section 22, an input section 23, a vibration generation section 24, a communication section 25, and a control section 26 provided respectively on the wearing member 2. In other words, the wearing member 2 includes the battery 21, the detection section 22, the input section 23, the vibration generation section 24, the communication section 25, and the control section 26.

The battery 21 supplies electric power with which the operation device 1 is operated. In the present embodiment, a chargeable secondary battery is adopted as the battery 21. However, this is not limitative, and the battery 21 may be a primary battery insofar as the operation device 1 is configured such that the battery 21 can be exchanged.

The detection section 22 detects a motion of the wearing member 2, namely, a motion of one hand of the user US wearing the operation device 1. Specifically, the detection section 22 detects an acceleration and an angular velocity varying according to the motion of the one hand and outputs signals according to the acceleration and angular velocity detected to the control section 26. Such a detection section 22 can be configured by an acceleration sensor and a gyro sensor.

While detailed illustration is omitted, the input section 23 is provided, for example, at a site exposed on the outside of a housing 30 described later, and includes a button or a touch sensor or the like with which inputting can be performed by one hand. Then, the input section 23 outputs a signal according to an input operation to the control section 26. Such an input section 23 constitutes an operation section that accepts an operation by the user US, together with the detection section 22 which detects a motion of one hand as an operation by the user US.

The vibration generation section 24 generates a vibration, under the control by the control section 26. The vibration generation section 24 can include, for example, a motor, and can include an actuator such as a solenoid or a piezoelectric element.

The communication section 25 communicates with the information processing device PD as an external device on a wireless basis, under the control by the control section 26. In other words, the communication section 25 functions as a transmission section that transmits operation information to an external device such as the information processing device PD. In other words, the communication section 25 corresponds to a transmission section that transmits to an external device the operation information according to the operation of the user US with respect to the detection section 22 and the input section 23 which are respective operation sections. In addition, the communication section 25 functions as a reception section that receives control information from an external device such as the information processing device PD. Note that the operation device 1 may be configured to communicate on a wired basis with an external device such as the information processing device PD.

The control section 26 controls an operation of the operation device 1. For example, the control section 26 transmits operation information according to a signal inputted according to an operation of the user US from the detection section 22 and the input section 23 which are respective operation sections to an external device such as the information processing device PD by the communication section 25. In addition, for example, the control section 26 causes the vibration generation section 24 to generate a vibration according to control information received by the communication section 25.

(Configuration of Wearing Member Worn on Left Hand)

Figure 3:
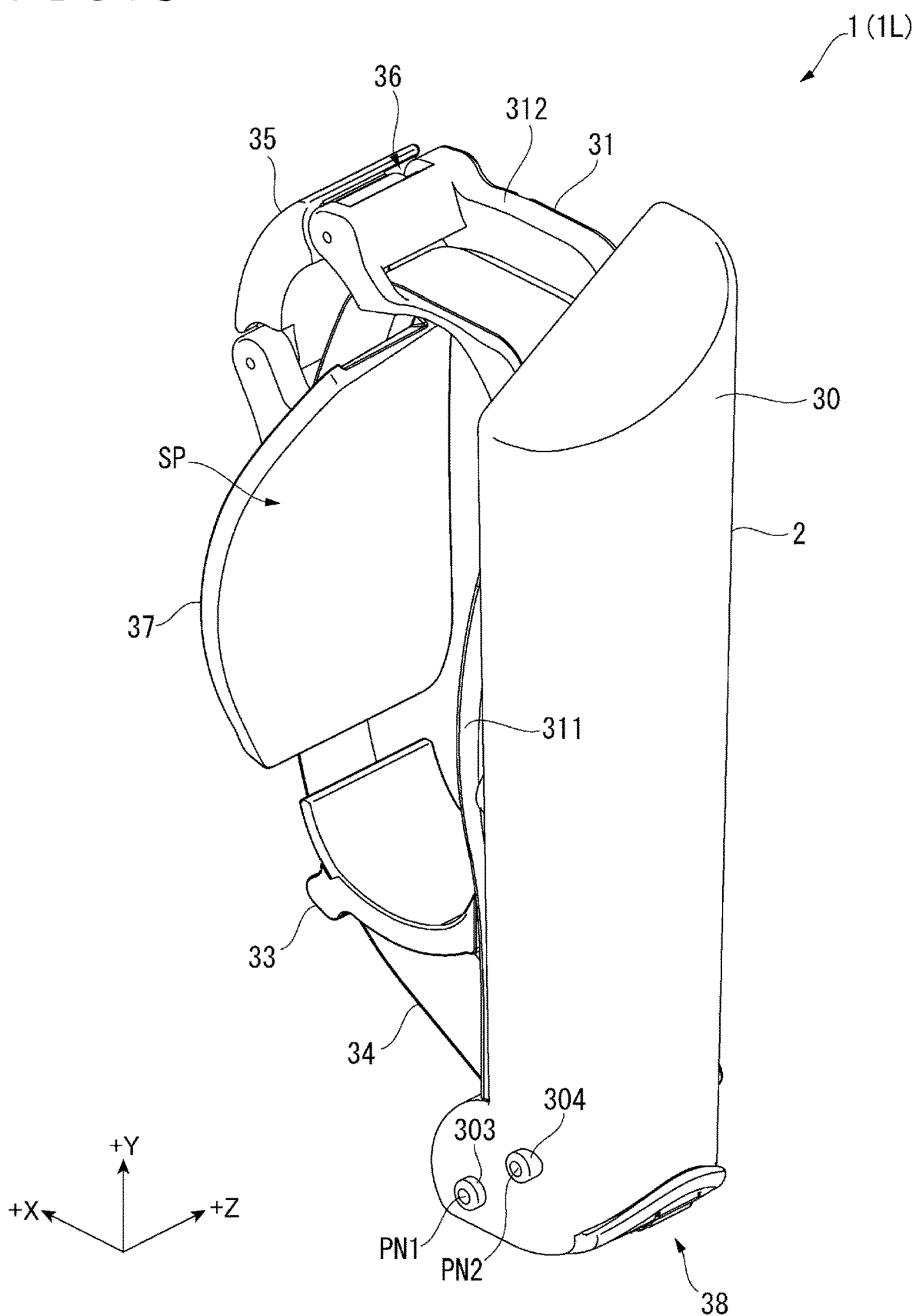
FIG. 3 is a perspective view depicting the operation device in the first embodiment.
Figure 4:
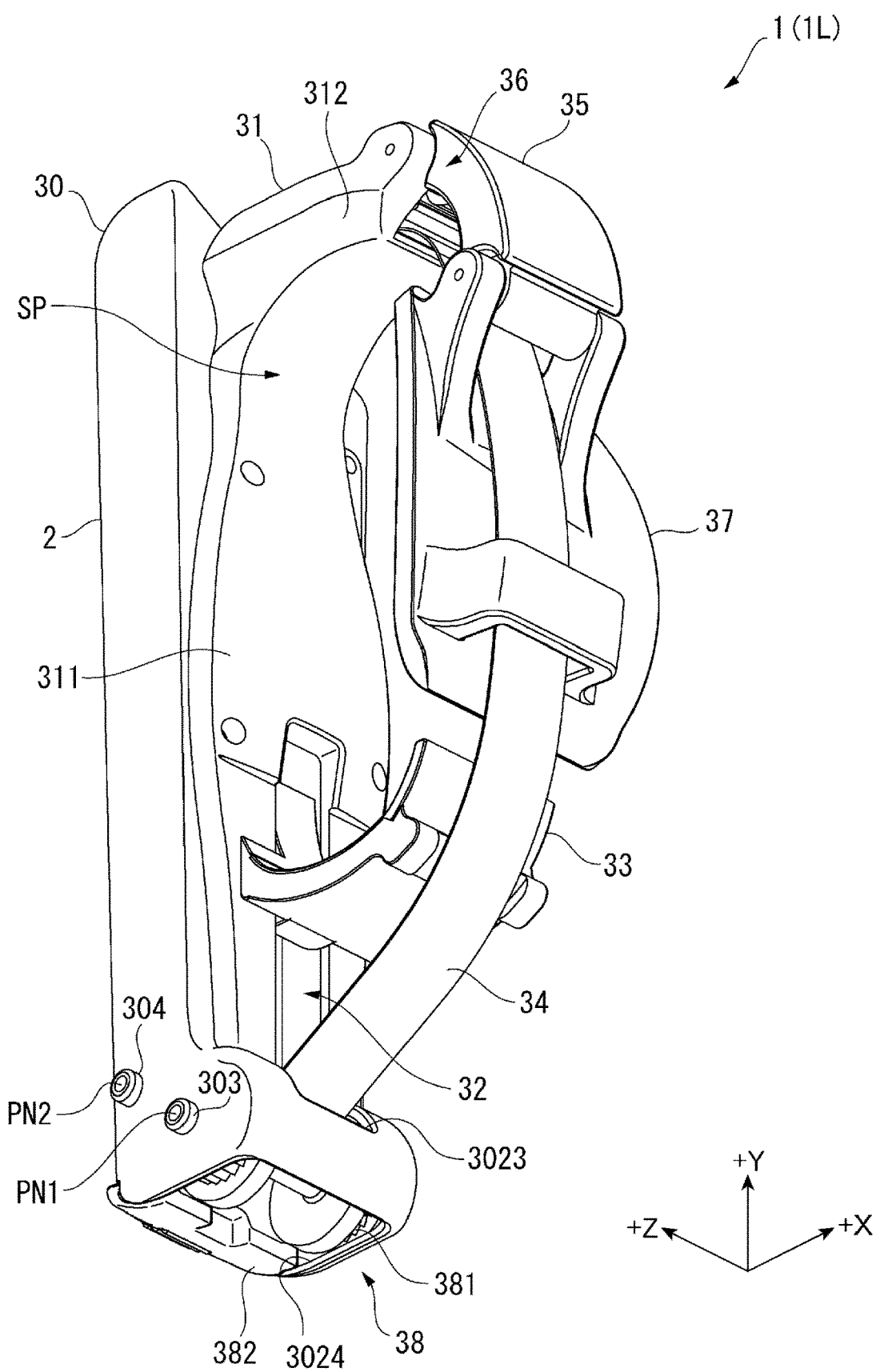
FIG. 4 is another perspective view depicting the operation device in the first embodiment.

FIGS. 3 and 4 are perspective views depicting the operation device 1 (1L) worn on the left hand LH. More in detail, FIG. 3 is a perspective view of the operation device 1L as viewed from an upper front side, and FIG. 4 is a perspective view of the operation device 1L as viewed from a lower back side. In addition, FIGS. 5 to 7 are a right side view, a left side view, and a top plan view depicting the operation device 1L grasped by the left hand LH.

As described above, the operation device 1L includes the wearing member 2 which is worn on the left hand LH.

As illustrated in FIGS. 3 to 7, the wearing member 2 includes a housing 30 as a substantially cylindrical site grasped by the left hand LH of the operation device 1L, and a support member 31, a first biasing member 32, a sliding member 33, a belt 34, a hinge 35, a second biasing member 36, a contact member 37, and a take-up mechanism 38 which are provided respectively in the housing 30. In addition, in a state in which the belt 34 is locked by the take-up mechanism 38, the wearing member 2 has a space SP which is a space surrounded by the support member 31, the belt 34, the hinge 35, and the contact member 37 and into which one hand of the user US is inserted.

Figure 5:
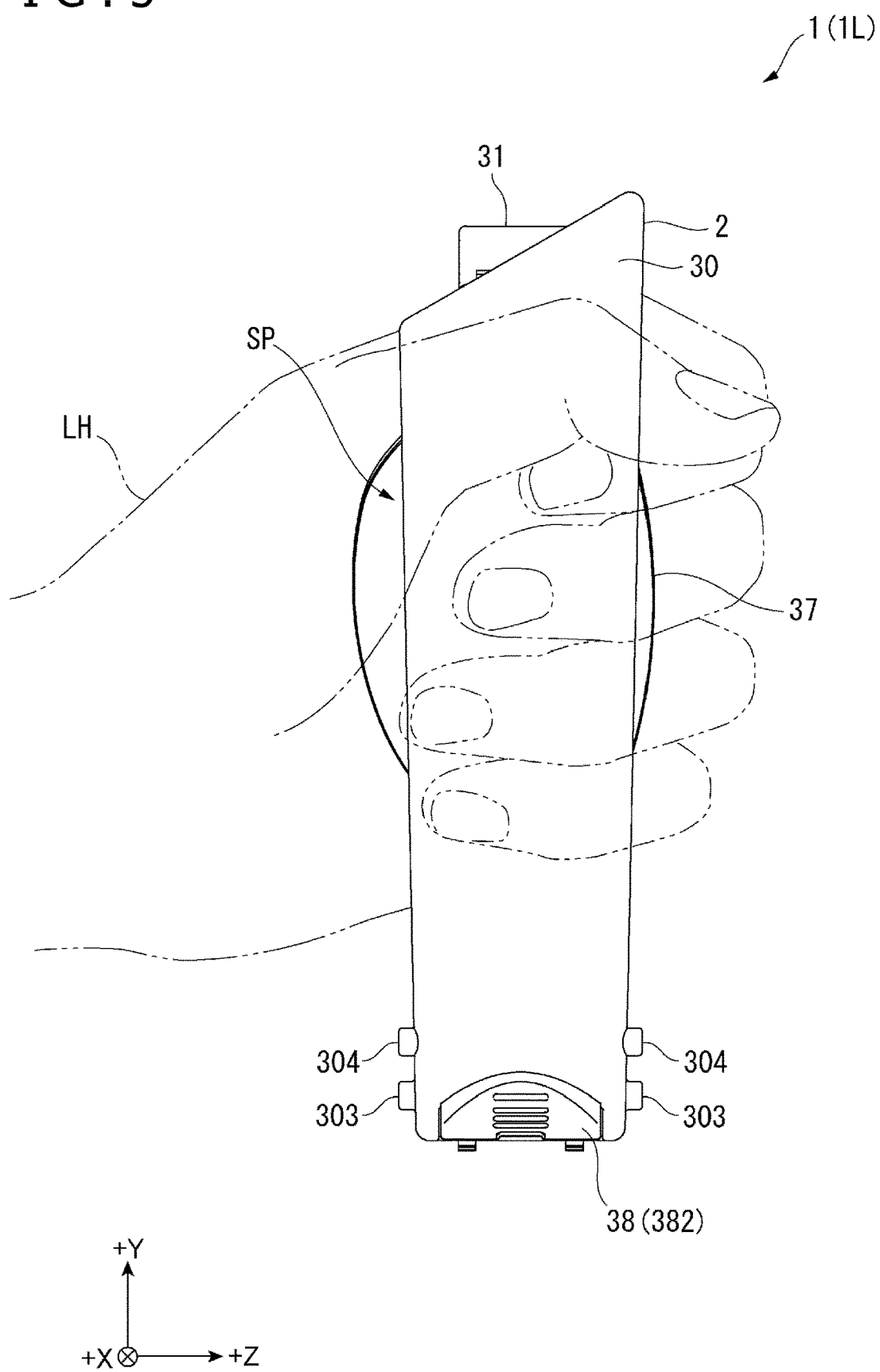
FIG. 5 is a right side view depicting the operation device grasped by the left hand in the first embodiment.
Figure 6:
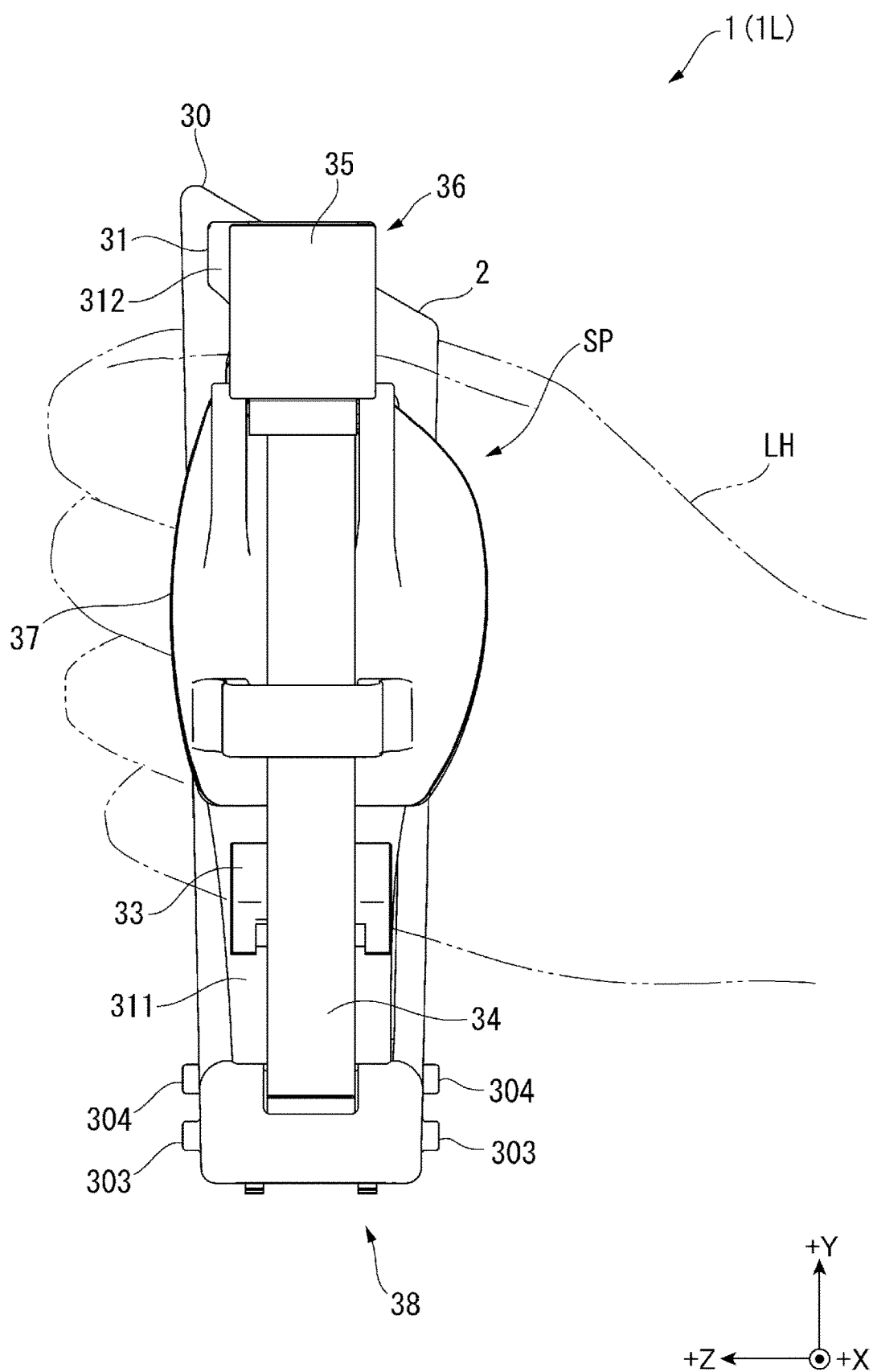
FIG. 6 is a left side view depicting the operation device grasped by the left hand in the first embodiment.
Figure 7:
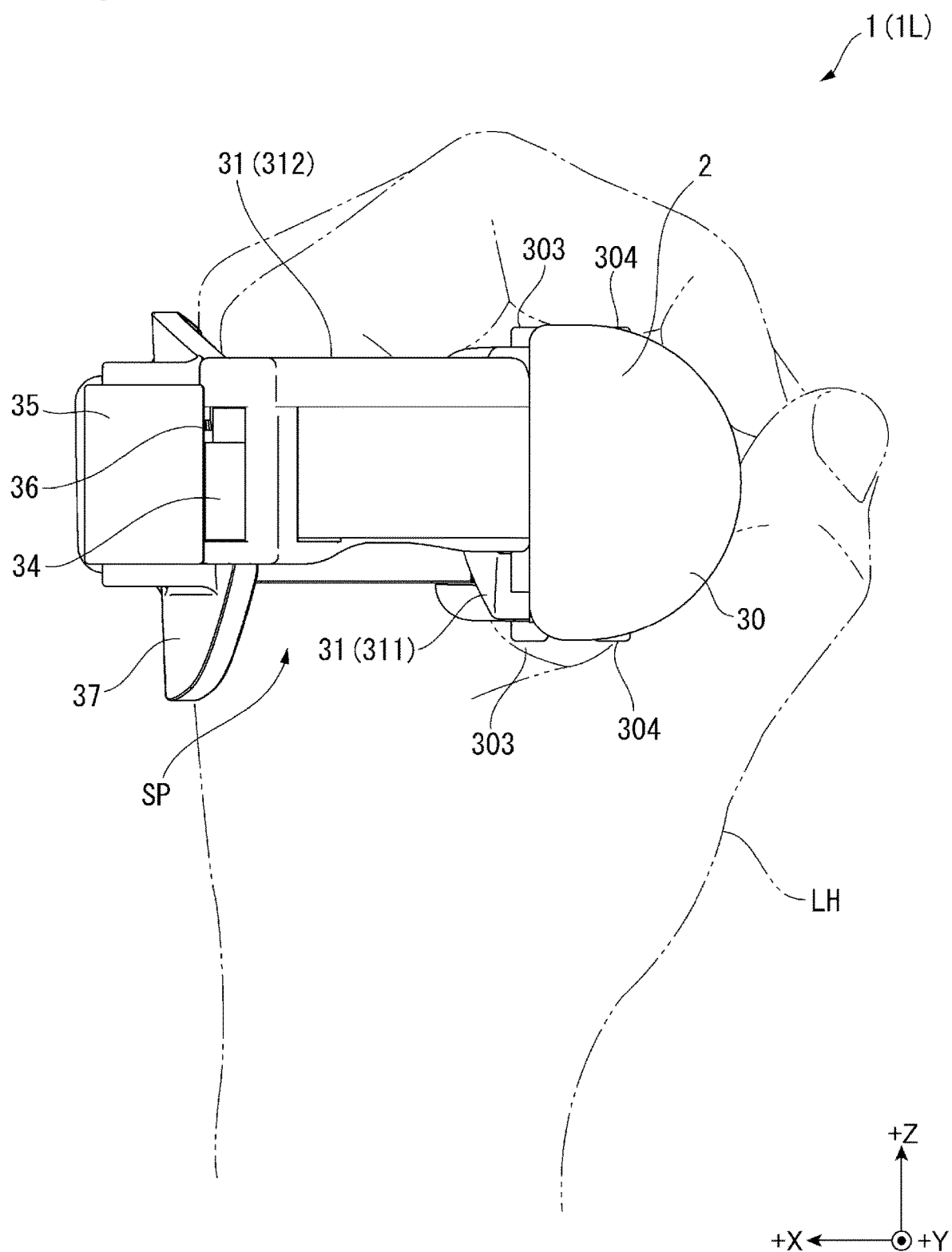
FIG. 7 is a top plan view depicting the operation device grasped by the left hand in the first embodiment.

As illustrated in FIGS. 5 to 7, in a state in which the housing 30 and the support member 31 are grasped by the left hand LH inserted into the space SP and the belt 34 is wound around the back of the left hand LH, the belt 34 is taken up, whereby the wearing member 2 of the operation device 1L is worn on the left hand LH. Thus, the housing 30 and the support member 31 can be said to be a grasped section grasped by one hand.

Note that the operation device 1L and the operation device 1R have mirror symmetric structures. Therefore, in the following description, the operation device 1L will be described in detail, whereas the description of the operation device 1R will be omitted.

In addition, in the following description, mutually orthogonal three directions will be a +X direction, a +Y direction, and a +Z direction. The left direction of the operation device 1L when grasped by the left hand LH will be the +X direction, the height direction of the operation device 1L will be the +Y direction, and the depth direction of the operation device 1L will be the +Z direction. Besides, while illustration is omitted, the direction opposite to the +X direction will be a −X direction, the direction opposite to the +Y direction will be a −Y direction, and the direction opposite to the +Z direction will be a −Z direction.

(Configuration of Housing)

Figure 8:
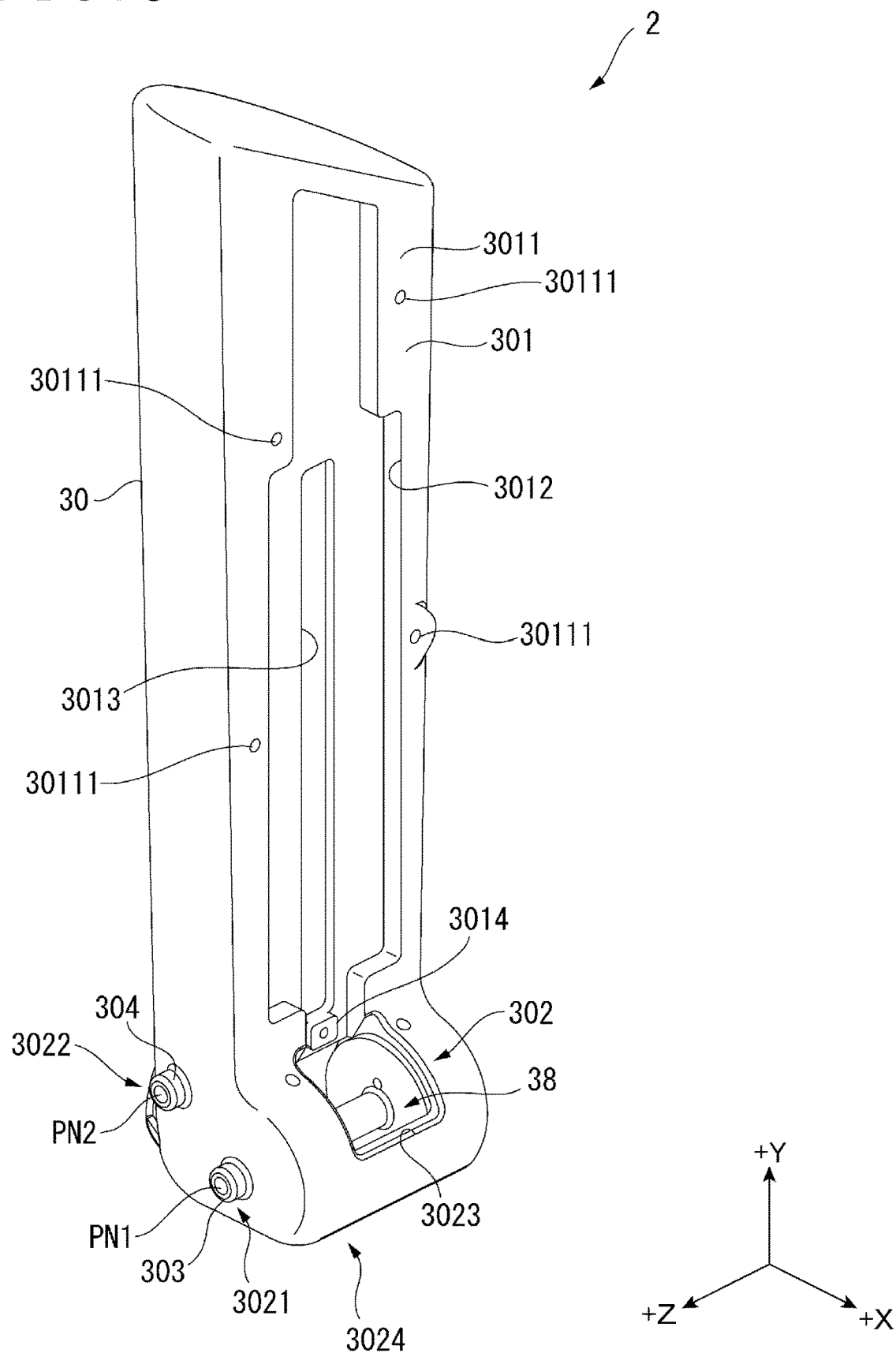
FIG. 8 is a perspective view depicting a housing in the first embodiment.

FIG. 8 is a perspective view of the housing 30 as viewed from the support member 31 side.

As depicted in FIG. 8, the housing 30 has a disposing section 301 where the support member 31 is disposed, an attaching section 302 to which the take-up mechanism 38 is attached, and projecting sections 303 and 304. The disposing section 301 is located at a site facing the support member 31 of the housing 30. The disposing section 301 has a fixing surface 3011 to which the support member 31 is fixed, a recess 3012 formed in the fixing surface 3011, a groove section 3013 provided at a bottom portion of the recess 3012, and a locking section 3014 provided at a bottom portion of the recess 3012.

The fixing surface 3011 is formed substantially flat exclusive of a site where the recess 3012 is formed. The fixing surface 3011 is provided with a plurality of tapped holes 30111 for screw engagement with screws (not illustrated) for fixing the support member 31.

The sliding member 33 is slidably disposed between the recess 3012 and the support member 31 when the support member 31 is attached to the fixing surface 3011.

The groove section 3013 is formed along a center axis of the housing 30. The first biasing member 32 biasing the sliding member 33 in the −Y direction is disposed in the groove section 3013 when the support member 31 is attached to the fixing surface 3011.

The locking section 3014 is provided in the −Y direction relative to the groove section 3013 at a bottom portion of the recess 3012 and locks one end of the first biasing member 32. Note that the other end of the first biasing member 32 is locked to the sliding member 33.

The attaching section 302 is located at one end of the housing 30. The attaching section 302 has a first support section 3021, a second support section 3022, a first opening 3023, and a second opening 3024.

The first support section 3021 rotatably support a reel 381 constituting the take-up mechanism 38. The first support section 3021 is a hole section in which a pin PN1 inserted in and passed through the reel 381 is inserted. The second support section 3022 rotatably supports a lever 382 constituting the take-up mechanism 38. The second support section 3022 also is a hole section in which a pin PN2 inserted in and passed through the lever 382 is inserted.

The first opening 3023 is an opening in and through which the belt 34 taken up on the reel 381 is inserted and passed. The first opening 3023 is opening in the +Y direction in relation to the reel 381.

The second opening 3024 is an opening through which the reel 381 and the lever 382 are exposed on the outside of the housing 30, as depicted in FIG. 3. The second opening 3024 is opening in the −Y direction in relation to the reel 381 and the lever 382.

The projecting sections 303 and 304 are projecting respectively in the ±Z directions from an outer surface of the housing 30. The projecting section 303 is provided such as to surround both end portions of the pin PN1, and the projecting section 304 is provided such as to surround both end portions of the pin PN2.

(Configuration of Support Member)

Figure 9:
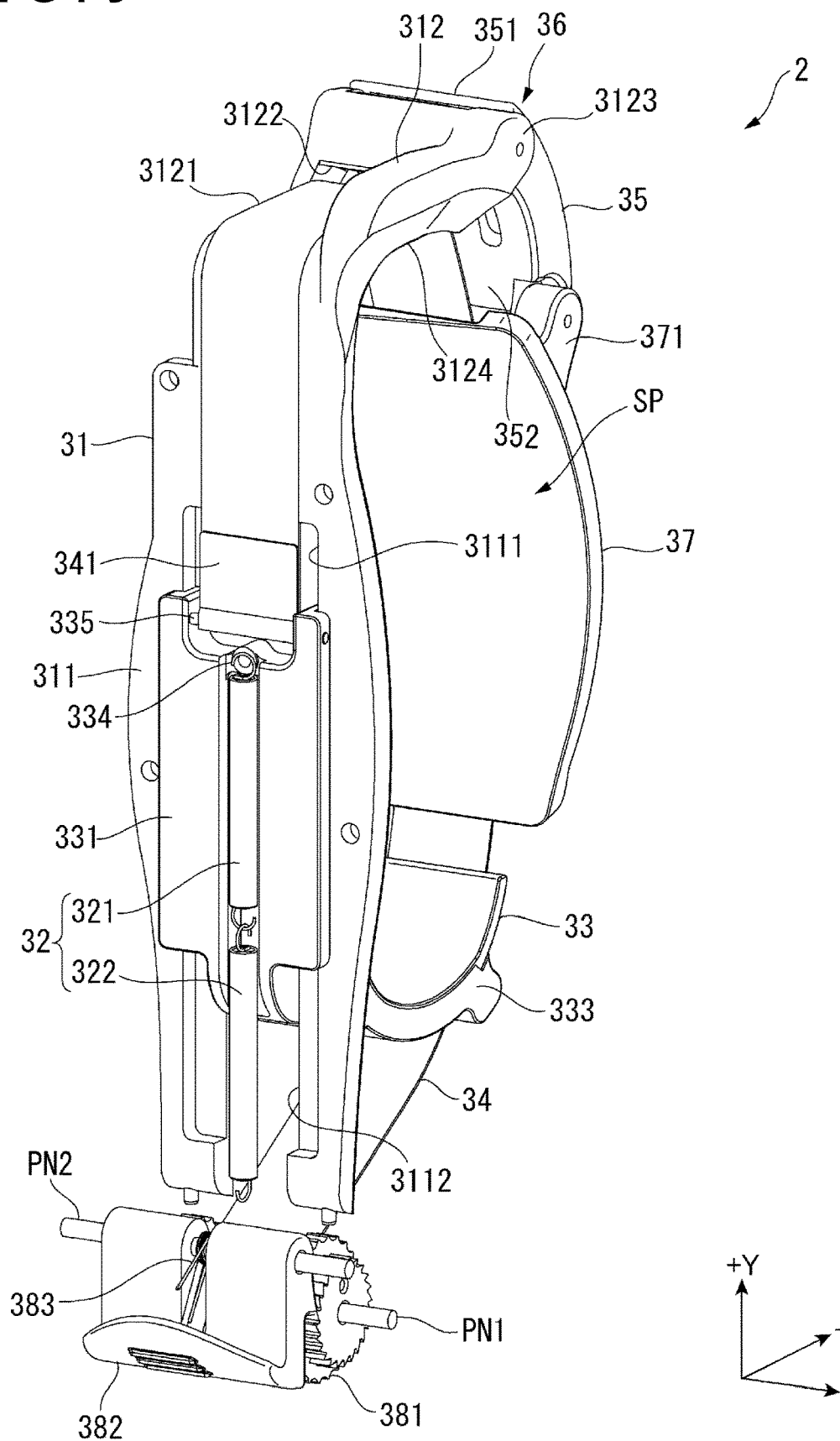
FIG. 9 is a perspective view depicting a wearing member in the first embodiment.
Figure 10:
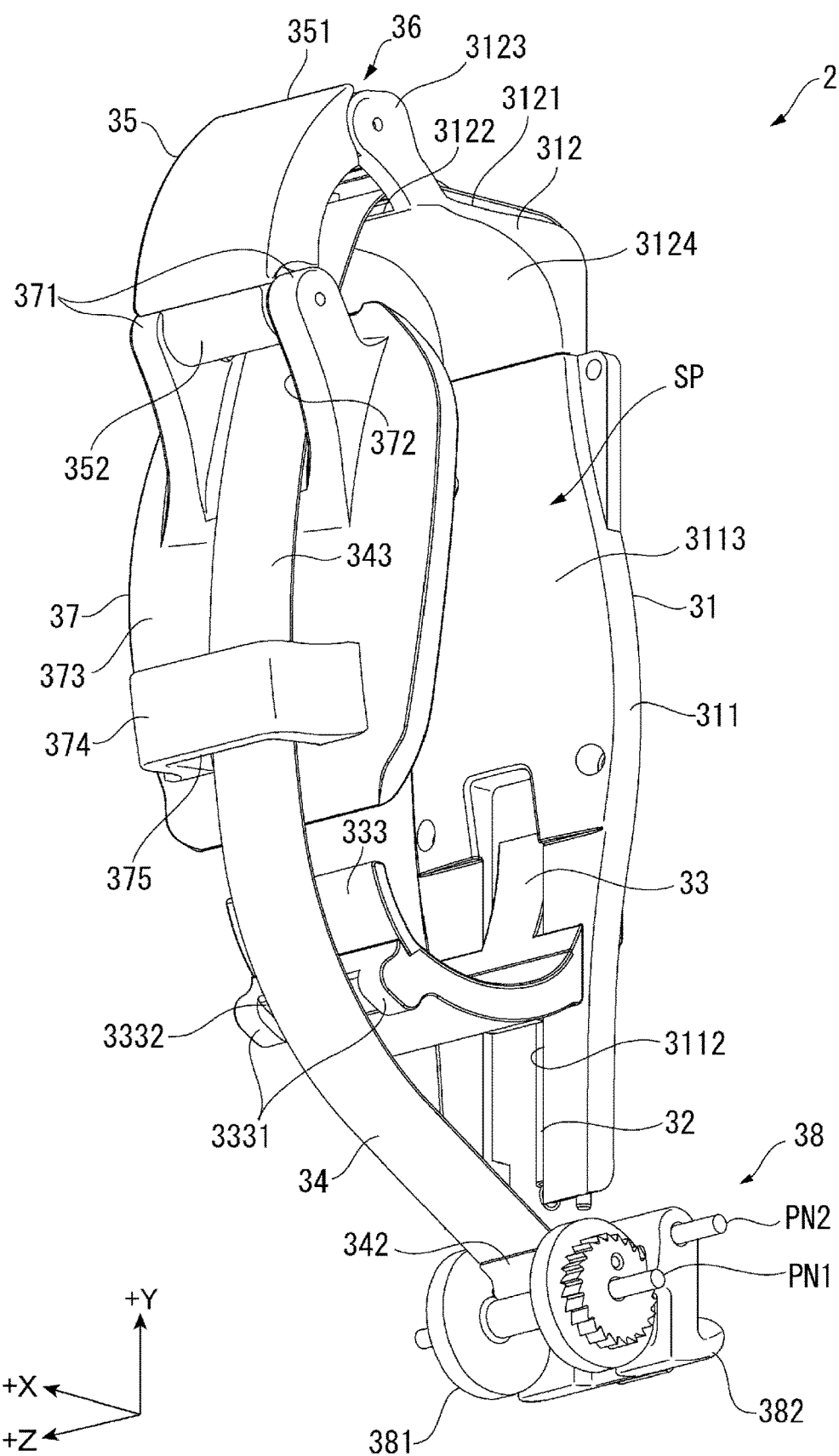
FIG. 10 is another perspective view depicting the wearing member in the first embodiment.

FIG. 9 is a perspective view of the wearing member 2 as viewed from the +Y direction in the −X direction. FIG. 10 is a perspective view of the wearing member 2 as viewed from the −Y direction in the +X direction. Note that, in FIGS. 9 and 10, illustration of the housing 30 is omitted.

The support member 31 supports the sliding member 33, the hinge 35, the second biasing member 36, and the contact member 37, and guide the sliding of the belt 34. Further, the support member 31 is a site brought into contact with the palm and the index finger of the left hand LH that grasps the operation device 1L. The support member 31 is a member extending mainly in the +Y direction which is the first direction and is formed in a reverse L shape as viewed in the +Z direction.

Such a support member 31 has a first support section 311 along the YZ plane, and a second support section 312 bent to the −X direction from the first support section 311 and along the XZ plane.

As depicted in FIG. 9, the first support section 311 has a guide section 3111 and an insertion section 3112, and, as depicted in FIG. 10, has a protruded surface section 3113.

As illustrated in FIG. 9, the guide section 3111 is a recess into which a part of the sliding member 33 is fitted, and guides sliding of the sliding member 33 in the ±Y directions.

The insertion section 3112 is a site cut out from an end portion in the −Y direction of the guide section 3111 toward the +Y direction. The insertion section 3112 is a site which positions the contact section 333 described later of the sliding member 33 in the +X direction in relation to the first support section 311, by insertion of the contact section 333 from the −Y direction.

As illustrated in FIG. 10, the protruded surface section 3113 is a surface in the +X direction of the first support section 311 and is formed in a protruded surface shape projecting in the +X direction. The protruded surface section 3113 is fitted in a hollow located in the center of the palm of the left hand LH when the wearing member 2 is worn on the left hand LH. As a result, oscillation in the ±Y directions and ±Z directions of the wearing member 2 worn on the left hand LH, and, hence, of the operation device 1L is restricted. In other words, the surface in the +X direction of the first support section 311 is a site brought into contact with the palm of the left hand LH.

As illustrated in FIGS. 9 and 10, the second support section 312 has a guide surface 3121, an opening 3122, a support section 3123, and a contact surface 3124.

The guide surface 3121 is a surface directed in the +Y direction of the second support section 312. The belt 34 extending along the +X direction from an end portion in the +Y direction of the first support section 311 extends along the guide surface 3121.

The opening 3122 is located at an end portion in the +X direction of the second support section 312. The opening 3122 is an opening in and through which the belt 34 is inserted and passed.

The support section 3123 supports the hinge 35 rotatably in the ±Y directions with a rotational axis along the +Z direction as a center. Note that one end of the second biasing member 36 biasing the hinge 35 in the +Y direction is locked to the second support section 312. The contact surface 3124 is a surface directed in the −Y direction of the second support section 312. The contact surface 3124 is brought into contact with a base portion of the index finger of the left hand LH when the wearing member 2 is worn on the left hand LH.

(Configuration of First Biasing Member)

The first biasing member 32 biases the sliding member 33 in the −Y direction.

In the present embodiment, as depicted in FIG. 9, the first biasing member 32 includes two tension springs 321 and 322 connected to each other, and is disposed in the groove section 3013 (see FIG. 8) of the housing 30. An end portion in the −Y direction of the first biasing member 32 is locked to the locking section 3014 (see FIG. 8) of the housing 30. An end portion in the +Y direction of the first biasing member 32 is locked to the sliding member 33 by a screw not illustrated.

(Configuration of Sliding Member)

Figure 11:
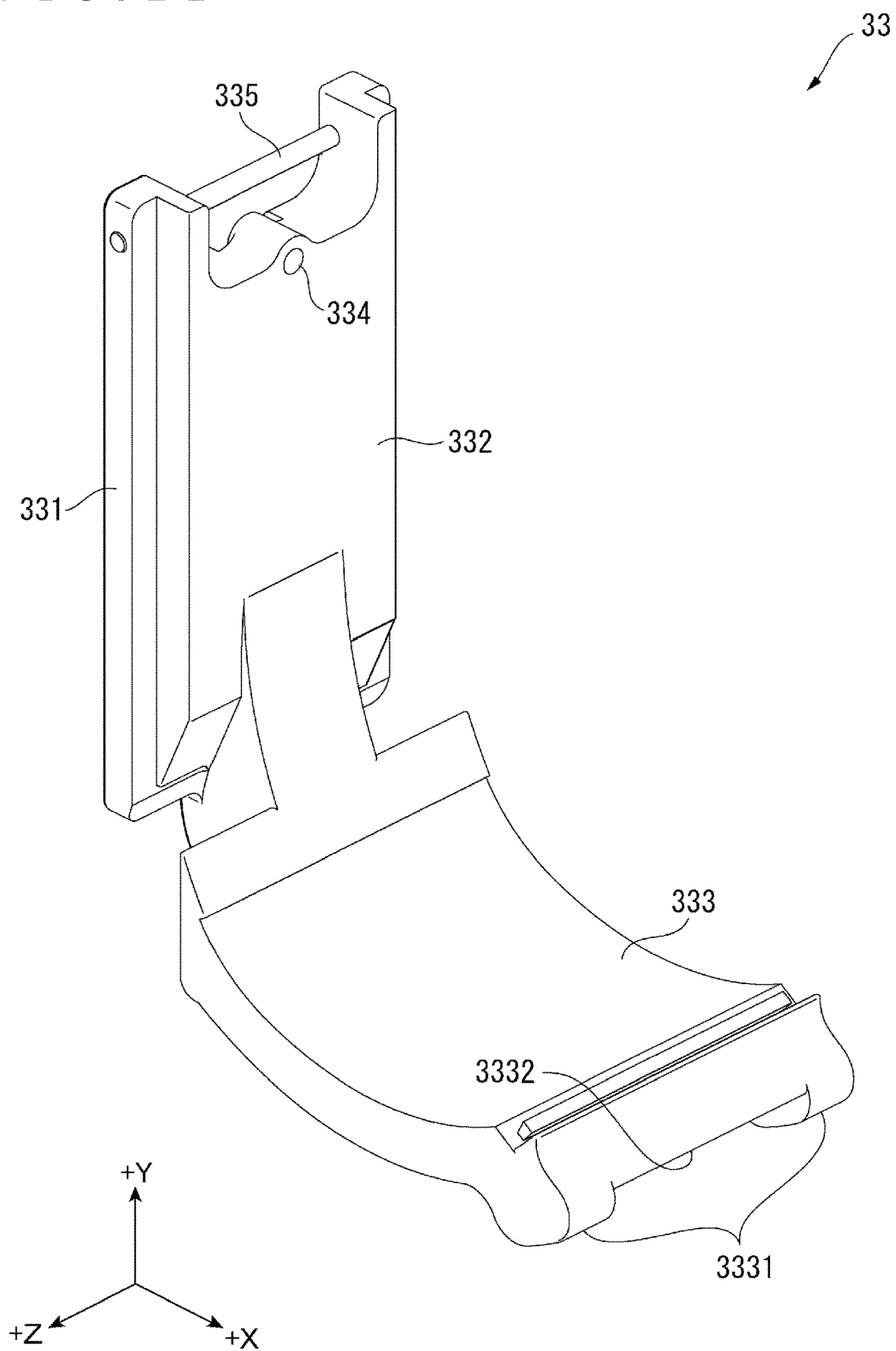
FIG. 11 is a perspective view depicting a sliding member in the first embodiment.

FIG. 11 is a perspective view depicting the sliding member 33.

As illustrated in FIGS. 9 and 10, the sliding member 33 slides along the ±Y directions along the guide section 3111 of the support member 31. While described in detail later, by sliding in the +Y direction according to take-up of the belt 34 by the take-up mechanism 38, the sliding member 33 makes contact with a site corresponding to a hypothenar of the left hand LH. As a result, oscillation in the ±Y direction of the wearing member 2, and, hence, the operation device 1L relative to the left hand LH is restricted.

As illustrated in FIGS. 9 to 11, such a sliding member 33 has a main body section 331, a fitting section 332, a contact section 333, a locking section 334, and a connection section 335.

The main body section 331 is formed in a plate shape along the YZ plane.

As depicted in FIG. 11, the fitting section 332 projects in the +X direction from the main body section 331. The fitting section 332 fits to the guide section 3111 of the support member 31 from the −X direction. With the fitting section 332 slid in the ±Y directions along the guide section 3111, the sliding member 33 slides in the ±Y directions.

The contact section 333 is bent to the +X direction from an end portion in the −Y direction of the main body section 331. More in detail, the contact section 333 is formed in an arcuate shape as viewed from the +X direction, projects in the +X direction in the −Y direction from an end portion in the −Y direction of the main body section 331, and thereafter projects in the +X direction in the +Y direction. The contact section 333 is disposed in the space SP into which the left hand LH is inserted.

When the sliding member 33 slides in the +Y direction in a state in which the left hand LH is in contact with the support member 31, the contact section 333 makes contact with a site corresponding to the hypothenar of the left hand LH. As a result, oscillation of the left hand LH in the −Y direction in relation to the wearing member 2, in other words, oscillation of the wearing member 2 in the +Y direction in relation to the left hand LH is restrained.

On the other hand, when the sliding member 33 slides in the −Y direction, the contact section 333 is separated from the left hand LH.

As illustrated in FIGS. 10 and 11, such a contact section 333 has a pair of projecting sections 3331 projecting in the −Y direction, at a tip portion in the projecting direction from the main body section 331. A surface between the pair of projecting sections 3331 is a guide surface 3332 that guides sliding of the belt 34. In other words, a part of the belt 34 is disposed between the pair of projecting sections 3331, and the belt 34 slides along the guide surface 3332.

The locking section 334 is provided at a site in the +Y direction of the main body section 331. The locking section 334 is a tapped hole in which a screw for locking an end portion in the +Y direction of the first biasing member 32 is inserted, whereby the locking section 334 locks the first biasing member 32. By a biasing force of the first biasing member 32, the sliding member 33 is biased in the −Y direction.

The connection section 335 is connected to one end of the belt 34. More in detail, the connection section 335 is a pin that is inserted in and passed through a first bent-back section 341 of the belt 34 in the +Z direction and that is fixed to the main body section 331 along the +Z direction.

(Configuration of Belt)

As illustrated in FIGS. 5 to 7, the belt 34 is disposed from the palm side along the back of the left hand LH. Then, the belt 34 is taken up by the take-up mechanism 38 attached to the attaching section 302 located at an end portion in the −Y direction of the housing 30, to thereby fasten the left hand LH and wear the wearing member 2, and, hence, the operation device 1L to the left hand LH. As depicted in FIG. 9, the belt 34 has the first bent-back section 341, and, as depicted in FIG. 10, has a second bent-back section 342 and a contractible-extendable section 343.

The first bent-back section 341 is located at one end of the belt 34, and the second bent-back section 342 is located at the other end of the belt 34. The first bent-back section 341 and the second bent-back section 342 are sites where end portions of a belt-shaped member constituting the belt 34 are bent back.

The first bent-back section 341 is connected to the connection section 335 of the sliding member 33, as described above.

The second bent-back section 342 is connected to the pin PN1 of the take-up mechanism 38.

The contractible-extendable section 343 is a site that is provided at a part of the belt 34 and is contractible and extendable in the extending direction of the belt 34. The contractible-extendable section 343 is disposed at a position according to the contact member 37 described later.

Here, when the belt 34 as a whole includes a belt-shaped member difficultly contractible and extendable, the wearing member 2 is liable to be detached from the left hand LH in the case where the belt 34 wound around the left hand LH is slightly slackened.

On the other hand, with the contractible-extendable section 343 contracted or extended, the belt 34 wound around the left hand LH extends at the time of taking up the belt 34, so that the wearing member 2 is restrained from being detached from the left hand LH even in the case where the belt 34 is slightly slackened.

(Configuration of Hinge) As illustrated in FIGS. 9 and 10, the hinge 35 connects the second support section 312 and the contact member 37. The hinge 35 has a first connection section 351 connected to the second support section 312 and a second connection section 352 connected to the contact member 37.

The first connection section 351 is connected to the support section 3123 such as to be rotatable in the ±Y directions with a rotational axis along the +Z direction as a center. The second biasing member 36 is provided between the first connection section 351 and the support section 3123.

The second connection section 352 is connected to the contact member 37 such as to be rotatable in the ±Y direction with a rotational axis along the +Z direction as a center.

(Configuration of Second Biasing Member)

The second biasing member 36 is provided between the support section 3123 of the support member 31 and the first connection section 351 of the hinge 35 and biases the hinge 35 in the +Y direction in relation to the second support section 312. In the present embodiment, a helical torsion coil spring is adopted as the second biasing member 36.

With the hinge 35 thus biased in the +Y direction, the contact member 37 is also biased in the +Y direction. As a result, the space SP which is a space into which the left hand LH is inserted is enlarged in diameter at the time of wearing the wearing member 2, and the left hand LH can be inserted easily into the space SP.

(Configuration of Contact Member)

As illustrated in FIGS. 6 and 7, the contact member 37 makes contact with the back of the left hand LH according to take-up of the belt 34 by the take-up mechanism 38 and presses the back of the left hand LH toward the first support section 311 side. As depicted in FIG. 10, the contact member 37 has a connection section 371, an opening 372, a guide surface 373, a projecting section 374, and an opening 375.

The connection section 371 clamps the second connection section 352 in the +Z direction and is connected to the second connection section 352 such as to be rotatable with a rotational axis along the +Z direction as a center.

The opening 372 is an opening which is defined by the connection section 371 and the second connection section 352 and in and through which the belt 34 is inserted and passed.

The guide surface 373 is a surface in the +X direction of the contact member 37. The belt 34 is disposed along the guide surface 373 and slides along the guide surface 373. The projecting section 374 is projecting in the +X direction from the guide surface 373. The opening 375 is formed on the inside of the projecting section 374. The belt 34 is inserted in and passed through the opening 375 in the −Y direction. The belt 34 inserted in and passed through the opening 375 in the −Y direction is engaged with the take-up mechanism 38.

FIG. 12 is a diagram depicting a section, along the XZ plane, of the wearing member 2 worn on the left hand LH. The contact member 37 is formed to be wider than the belt 34. In other words, the size in the +Z direction of the contact member 37 is larger than the size in the +Z direction of the belt 34.

As illustrated in FIG. 12, the wearing member 2 makes contact with the left hand LH at at least three sites of one site ST1 of the palm of the left hand LH which makes contact with the protruded surface section 3113 of the support member 31 and two sites ST2 and ST3 of the back of the left hand LH that make contact with both end in the +Z direction of the contact member 37. As a result, in a state in which the operation device 1L is worn on the left hand LH, the wearing member 2 is restrained from rotating with a rotational axis along the +Y direction as a center to be deviated from the left hand LH. Therefore, the wearing member 2, and, hence, the operation device 1L are worn stably on the left hand LH.

(Configuration of Take-Up Mechanism)

Figure 13:
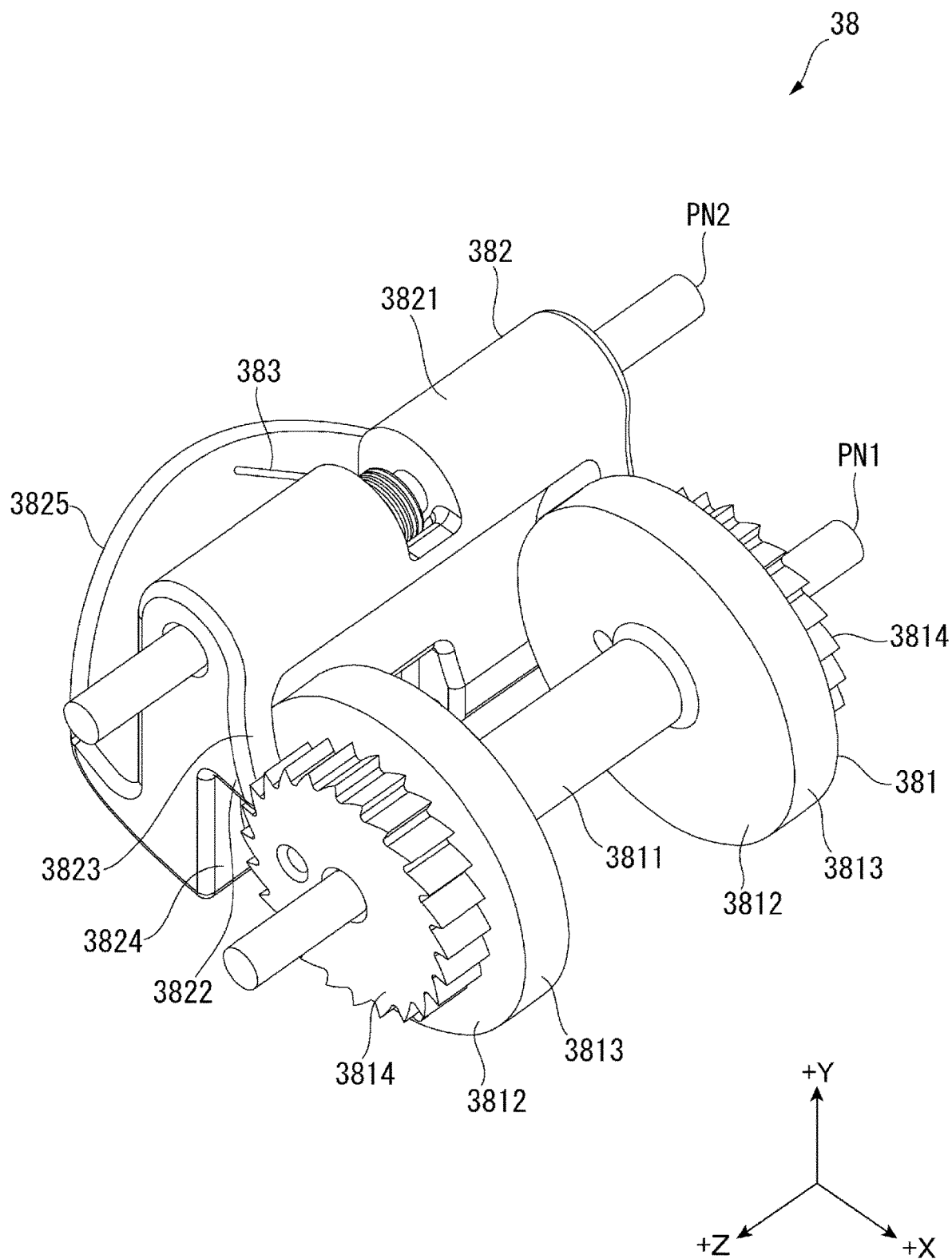
FIG. 13 is a perspective view depicting a take-up mechanism in the first embodiment.
Figure 14:
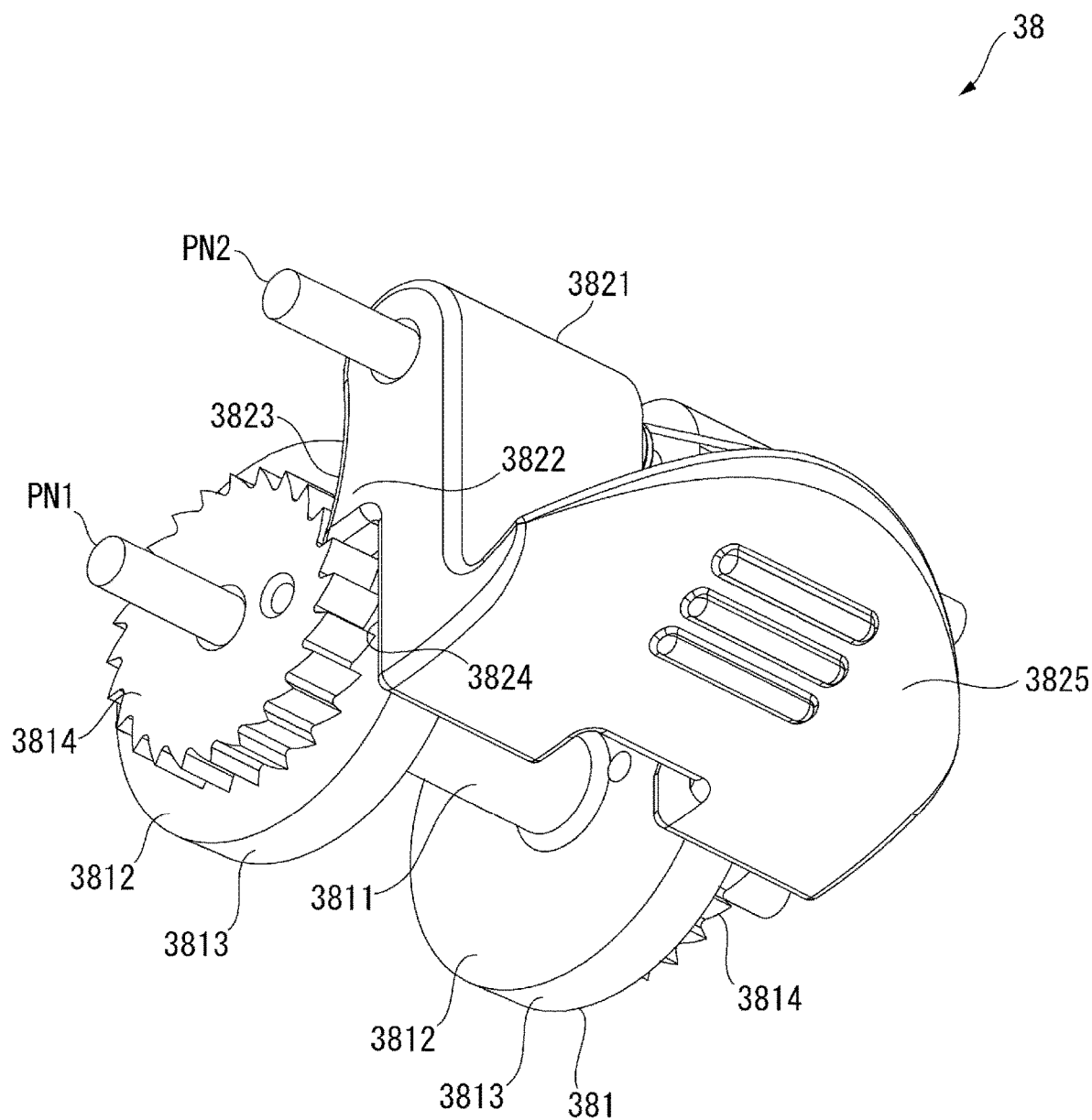
FIG. 14 is another perspective view depicting the take-up mechanism in the first embodiment.

FIGS. 13 and 14 are perspective views depicting the take-up mechanism 38. Of these, FIG. 13 is a perspective view of the take-up mechanism 38 as viewed from the +Z direction in the +Y direction, and FIG. 14 is a perspective view of the take-up mechanism 38 as viewed from the −Z direction in the −Y direction.

The take-up mechanism 38 is attached to the attaching section 302 located in the −Y direction of the housing 30 and takes up the belt 34. As depicted in FIGS. 13 and 14, the take-up mechanism 38 has the reel 381, the lever 382, a third biasing member 383, and the pins PN1 and PN2. Of these, the third biasing member 383 biases the lever 382 toward the reel 381 side. In the present embodiment, the third biasing member 383 includes a helical torsion coil spring disposed along a circumferential surface of the pin PN2, its one end is locked to the housing 30, and its other end is engaged with the lever 382.

The reel 381 is rotated by an external force to take up the belt 34. The reel 381 has a shaft section 3811, roll sections 3812, anti-slip sections 3813, and meshing sections 3814.

The shaft section 3811 is formed in a cylindrical shape. Though illustration is omitted, the shaft section 3811 has a hole penetrating the shaft section 3811 along a center axis of the shaft section 3811. A pin PN1 rotatably attaching the reel 381 to a first support section 231 is inserted in and passed through the hole. Other than this, the shaft section 3811 has an attaching section to which the second bent-back section 342 of the belt 34 is attached.

The roll sections 3812 are sites larger than the shaft section 3811 in diameter and are provided respectively at both ends of the shaft section 3811. Each roll section 3812 is exposed more in the −Y direction than the housing 30, through the second opening 3024 of the housing 30. The anti-slip sections 3813 are provided at circumferential surfaces of the roll sections 3812. The anti-slip sections 3813 permit the reel 381 to be rotated easily by an external force. In other words, the anti-slip sections 3813 enlarge resistance with a contact surface of an object for applying a rotational force to the roll section 3812, to thereby facilitate transmission of the rotational force from the object to the roll section 3812, and to thereby facilitate rotation of the reel 381. Examples of the anti-slip sections 3813 include a rubber sheet or a silicone sheet that is adhered to the circumferential surfaces of the roll sections 3812.

The meshing sections 3814 are gear-shaped sections formed integrally with the roll sections 3812. More in detail, the meshing sections 3814 are provided at surfaces on the opposite sides of the facing surfaces of the roll sections 3812.

The meshing sections 3814 restrict rotation of the reel 381 in a direction opposite to the take-up direction of the belt 34 by the reel 381. In other words, the meshing sections 3814 function as gears of ratchet mechanisms, and a plurality of gear teeth formed at circumferential surfaces of the meshing sections 3814 can mesh with claw sections 3822 of the lever 382.

The lever 382 is rotatably supported on the second support section 232 by the pin PN2. The lever 382 meshes with each meshing section 3814, restricts rotation of the reel 381 in a direction opposite to the take-up direction of the belt 34, and locks the belt 34. The lever 382 has a main body section 3821, the claw sections 3822, curved surfaces 3823, a first contact surface 3824, and a second contact surface 3825.

The main body section 3821 is supported by the second support section 232 such as to be rotatable with a rotational axis along the +Z direction as a center, by the pin PN2 inserted in and passed through the main body section 3821 along the +Z direction.

The claw sections 3822 project respectively to the reel 381 side from both ends in the +Z direction of the main body section 3821 and can mesh with the gear teeth of the meshing sections 3814. The claw sections 3822 are acute-angle claws having the curved surfaces 3823 along the take-up direction of the belt 34 by the reel 381. As described above, the lever 382 is biased by the third biasing member 383 in a direction for the claw sections 3822 to mesh with the gear teeth of the meshing sections 3814. In the case where the reel 381 is rotated in the take-up direction of the belt 34 in this state, the gear teeth of the meshing sections 3814 make contact with the curved surfaces 3823 to rotate the lever 382 in a direction opposite to the acting direction of the biasing force, and therefore, the claw sections 3822 are separated from the gear teeth of the meshing sections 3814. As a result, rotation of the reel 381 in the take-up direction is permitted.

On the other hand, when the reel 381 is about to rotate in the direction opposite to the take-up direction of the belt 34 in a state in which the claw sections 3822 are meshed with the gear teeth of the meshing sections 3814, the acute-angle claw sections 3822 mesh with the gear teeth of the meshing sections 3814. As a result, rotation of the reel 381 in the direction opposite to the take-up direction of the belt 34 is restricted.

The first contact surface 3824 is a flat surface located in the −Y direction relative to the claw section 3822 of the main body section 3821 and along the YZ plane. More in detail, the first contact surface 3824 is a flat surface located in the +X direction relative to the rotational axis of the lever 382 and along the YZ plane. When a pressing body not illustrated which presses and rotates the lever 382 is brought into contact with the first contact surface 3824 and the lever 382 is rotated in the direction for separating from the reel 381, the claw sections 3822 are separated from the gear teeth of the meshing sections 3814, and restriction of rotation of the reel 381 in the direction opposite to the take-up direction of the belt 34 is released.

The second contact surface 3825 is an end surface in the −Y direction of the main body section 3821. For example, a pressing body such as a finger of the user US makes contact with the second contact surface 3825 and the lever 382 is rotated in the direction for separating from the reel 381, restriction of rotation of the reel 381 in the direction opposite to the take-up direction of the belt 34 is released, as described above.

When the restriction of rotation of the reel 381 is released, the sliding member 33 is slid in the −Y direction by the biasing force of the first biasing member 32. When the sliding member 33 slides in the −Y direction, the belt 34 connected to the sliding member 33 is pulsed from the reel 381, and the abovementioned space SP is enlarged in diameter. As a result, the left hand LH can be separated from the wearing member 2, and, hence, from the operation device 1L.

(Wearing of Wearing Member on Left Hand)

Figure 15:
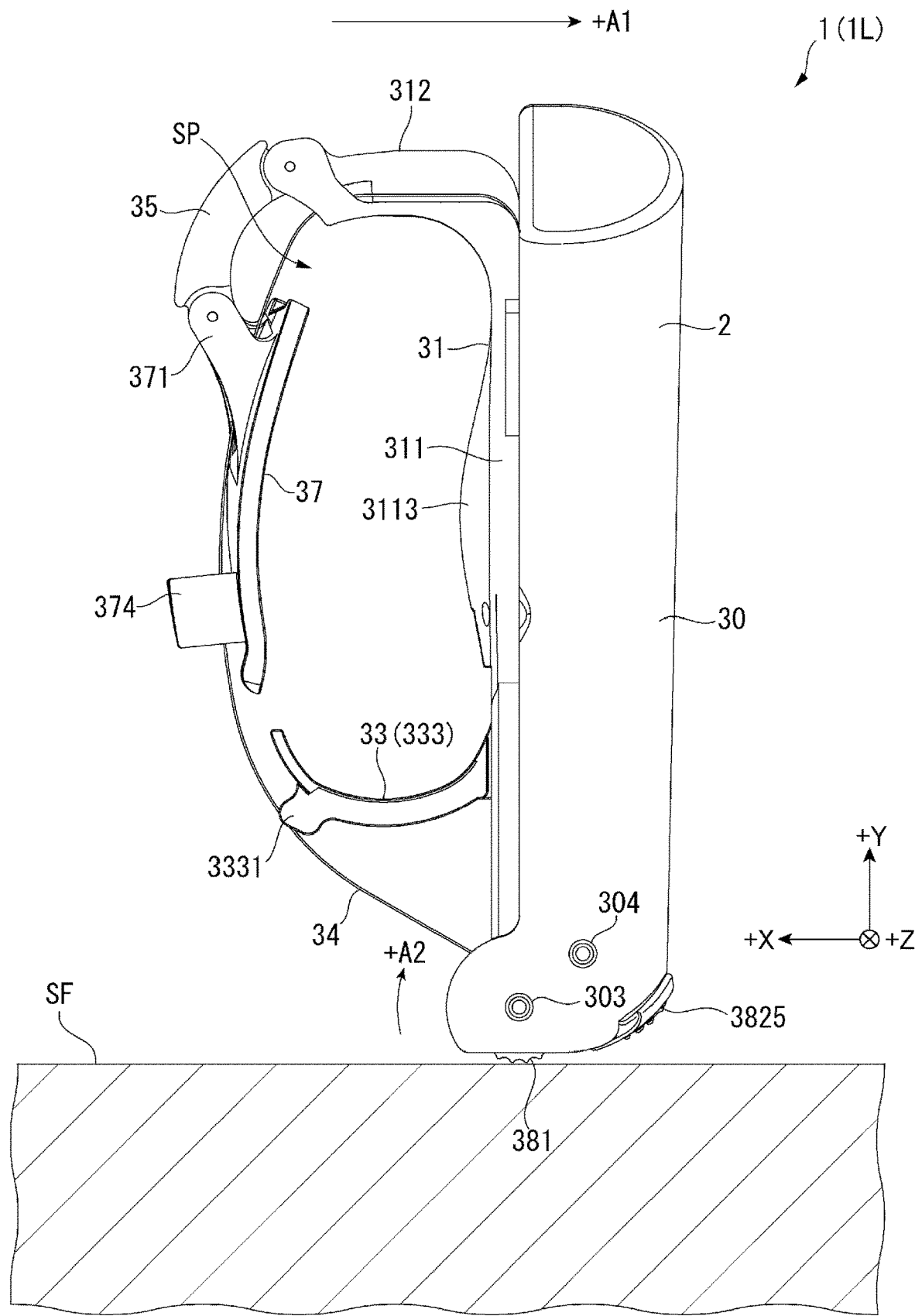
FIG. 15 is a diagram for explaining a wearing method of the operation device in the first mechanism.

FIG. 15 is a diagram depicting a wearing method of the operation device 1L.

After the left hand LH is inserted into the space SP and the housing 30 and the support member 31 are grasped, the operation device 1L is moved in an A1 direction opposite to the +X direction in a state in which the reel 381 exposed from the housing 30 is in contact with a predetermined surface SF, as depicted in FIG. 15, upon which the reel 381 is rotated in an A2 direction, and the belt 34 is taken up. As a result, the operation device 1L is worn on the left hand LH.

On the other hand, as described above, rotation of the reel 381 in the direction opposite to the take-up direction of the belt 34, namely, rotation of the reel 381 in the direction for slackening the belt 34 is restricted by the lever 382. Therefore, at the time of releasing the left hand LH from the operation device 1L, the first contact surface 3824 or the second contact surface 3825 is pressed. As a result, restriction of rotation of the reel 381 is released, the belt 34 is slackened by the biasing force of the first biasing member 32, and the left hand LH is released from the wearing member 2, and, hence, the operation device 1L.

Note that, as described above, the operation device 1R is in mirror symmetry with the operation device 1L and has a configuration similar to the operation device 1L. Therefore, the operation device 1R can be worn on the right hand RH by a procedure similar to the procedure of wearing the operation device 1L on the left hand LH, and the right hand RH can be released from the operation device 1R by a procedure similar to the procedure of release of the left hand LH from the operation device 1L.

(Effect of First Embodiment)

According to the operation device 1 (1L, 1R) according to the present embodiment as described above, the following effects can be produced.

The operation device 1 (1L, 1R) includes the wearing member 2. The wearing member 2 includes the support member 31 that extends in the +Y direction which is the first direction, the belt 34 that extends from a site in the +Y direction of the support member 31, the sliding member 33 that is connected to one end of the belt 34 and slides in the +Y direction along the first support section 311 of the support member 31, and the take-up mechanism 38 as a locking section that is provided in the −Y direction which is the direction opposite to the +Y direction in relation to the support member 31 and takes up and locks a site on the other end side of the belt 34. In a state in which the belt is locked by the take-up mechanism 38, the space SP surrounded by the support member 31 and the belt 34 and the like is formed, and the contact section 333 making contact with one hand of the user US of the sliding member 33 is disposed in the space SP.

According to such a configuration, the belt 34 is pulled in the direction in which the sliding member 33 connected to one end of the belt 34 slides in the +Y direction, whereby the contact section 333 that is a part of the sliding member 33 and disposed in the space SP into which one hand of the user US is inserted slides in the +Y direction, and makes contact with the one hand of the user US. In this state, the belt 34 is locked by the take-up mechanism 38, whereby the wearing member 2, and, hence, the operation device 1 (1L, 1R) can be worn stably on the one hand.

The wearing member 2 includes the take-up mechanism 38 that is provided in the −Y direction which is the direction opposite to the +Y direction in relation to the support member 31 and that takes up a site on the other end side of the belt 34, and the take-up mechanism 38 is a locking section for locking the belt 34.

According to such a configuration, by taking up the belt 34 by the take-up mechanism 38, a state in which the sliding member 33 slides in the +Y direction can be maintained. In addition, by taking up the belt 34 by the take-up mechanism 38, the other end of the belt 34 can be restrained from extending to the outside of the wearing member 2, so that the external appearance of the operation device 1 can be made favorable, and, in addition, the belt 34 can be restrained from exposing at the time of use of the operation device 1.

The take-up mechanism 38 has the reel 381 for taking up the belt 34, and the reel 381 is exposed on the exterior through the second opening 3024 of the housing 30. According to such a configuration, the reel 381 can be rotated by sliding the operation device 1 in a state in which the reel 381 is in contact with a predetermined surface. Therefore, the reel 381 can be rotated easily, and, in a state in which the housing 30 and the support member 31 are grasped by one hand, the belt 34 can be taken up easily.

The take-up mechanism 38 has the anti-slip section 3813 located at the circumferential surface of the roll section 3812 constituting the reel 381.

According to such a configuration, frictional resistance of the roll section 3812 relative to the predetermined surface can be enlarged, so that the roll section 3812, and, hence, the reel 381 can be rotated easily. Therefore, the take-up operation of the belt 34 by the reel 381 can be carried out easily.

The wearing member 2 includes the first biasing member 32 that biases the sliding member 33 in the −Y direction which is the direction opposite to the +Y direction. According to such a configuration, when the lock of the belt 34 by the take-up mechanism 38 is released, the biasing force of the first biasing member 32 slides the sliding member 33 in the −Y direction. In this instance, not only the contact section 333 is separated from one hand, but also the belt 34 having its one end connected to the sliding member 33 is drawn out of the take-up mechanism 38, so that the belt 34 can be slackened, and the space SP can be enlarged. Therefore, the one hand can be detached easily from the wearing member 2.

The wearing member 2 is a wearing member worn on the left hand LH or the right hand RH which is one hand of the user US. The support member 31 is disposed on the palm side of one hand, and the belt 34 extends from the support member 31 and is disposed along the back of the one hand.

According to such a configuration, in a state in which the support member 31 is grasped by fingers of one hand, the belt 34 extending from the support member 31 is disposed along the back of the one hand, whereby the wearing member 2 is worn on the one hand. Accordingly, the wearing member 2 can be worn stably on one hand, as compared to the case where the belt 34 is disposed along the palm of the hand. In addition, an input operation on the input section 23 provided on the housing 30 can be carried out by the fingers grasping the housing 30 and the support member 31, so that versatility of the operation device 1 can be enhanced.

The wearing member 2 includes the hinge 35 connected to the second support section 312 which is a site in the +Y direction of the support member 31, the second biasing member 36, and the contact member 37 with which the belt 34 communicates, the contact member 37 being connected to the hinge 35 and making contact with the back of one hand. The second biasing member 36 biases the hinge 35 in the direction for enlarging the diameter of the space SP which is the space surrounded by the support member 31, the belt 34, the hinge 35, and the contact member 37 and into which one hand is inserted.

According to this, with the space SP enlarged in diameter, the one hand can be inserted easily into the space SP, so that the wearing of the wearing member 2, and, hence, the operation device 1 on the one hand can be performed easily.

The contact member 37 is wider than the belt 34. In other words, the size in the +Z direction of the contact member 37 is larger than the size in the +Z direction of the belt 34.

According to such a configuration, the area of contact between the contact member 37 and the back of the hand of the user US can be enlarged. Besides, when the operation device 1 is worn on one hand, the wearing member 2 and the one hand make contact with each other at the at least three sites ST1 to ST3, and therefore, the wearing member 2 worn on the one hand, and, hence, the operation device 1 can be restrained from rotating with a rotational axis along the +Y direction as a center. Therefore, the operation device 1 including the wearing member 2 can be worn stably on one hand.

The belt 34 has a contractible-extendable section 343 that is contractible and extendable along the belt 34. According to such a configuration, as described above, even in the case where the belt 34 is slackened due to contraction or extension of the contractible-extendable section 343, the wearing member 2 is restrained from being detached from one hand of the user US. Therefore, the operation device 1 can be worn stably on one hand.

The wearing member 2 includes the detection section 22 and the input section 23 as operation sections that accept an input operation by the user US, and the communication section 25 as a transmission section that transmits operation information according to the input operation.

According to such a configuration, a function as the operation device 1 for transmitting operation information according to an operation by the user US can be realized by the wearing member 2.

Second Embodiment

Next, a second embodiment of the present invention will be described.

An information processing system according to the present embodiment has a configuration similar to that of the information processing system SY depicted in the first embodiment, but it differs in the configuration of the wearing member constituting the operation device, and in that it includes a cradle. Note that, in the following description, the same or substantially the same parts as those described already are denoted by the same signs as used above, and descriptions thereof will be omitted.

Figure 16:
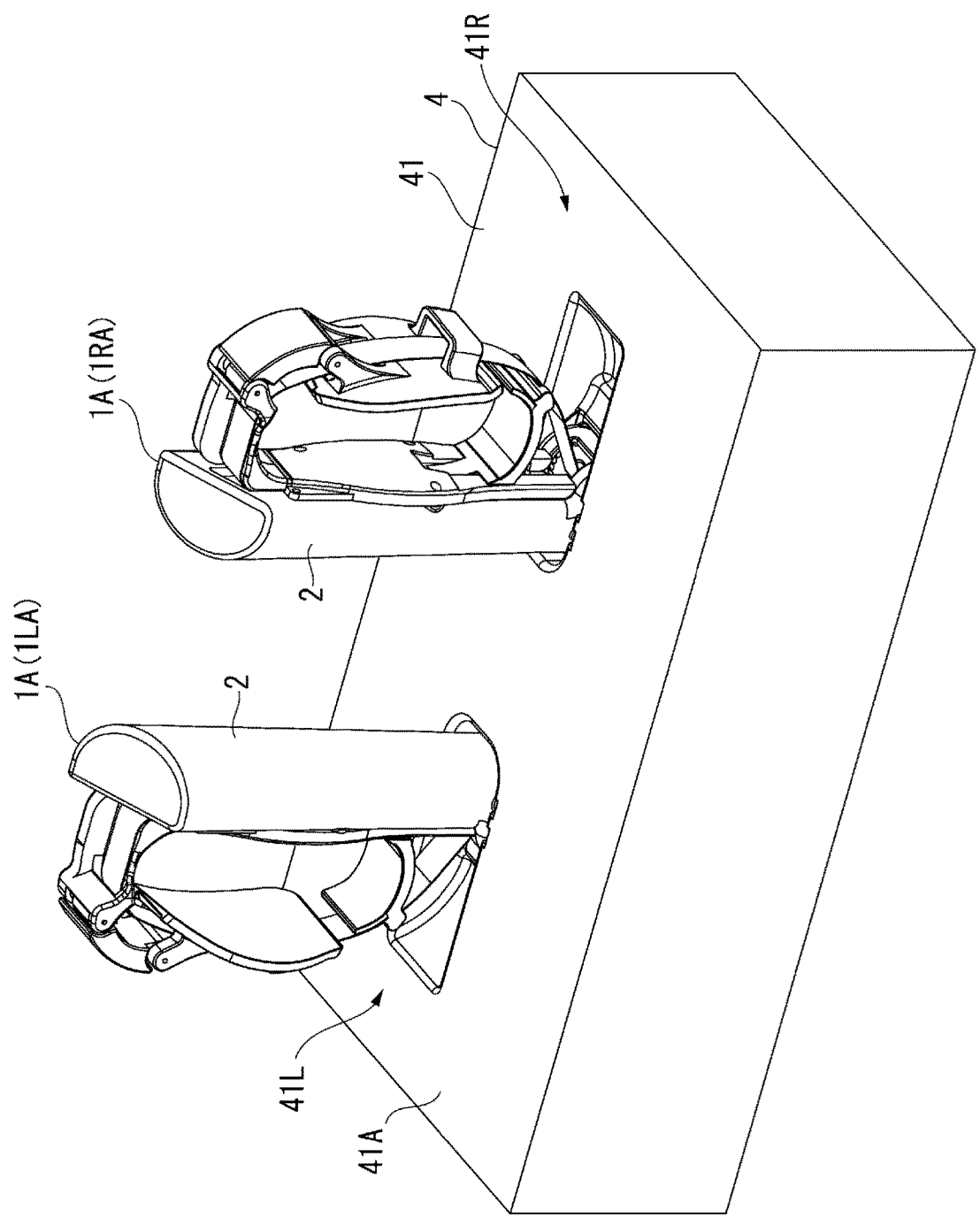
FIG. 16 is a perspective view depicting an operation device constituting an information processing system and a cradle in a second embodiment.

FIG. 16 is a perspective view depicting an operation device 1A (1LA, 1RA) and a cradle 4 constituting the information processing system according to the present embodiment.

As depicted in FIG. 16, the information processing system according to the present embodiment has a configuration and a function similar to the information processing system SY, except that it has an operation device 1A (1LA, 1RA) in place of the operation device 1 (1L, 1R) and that it further has the cradle 4.

(Configuration of Operation Device)

The operation device 1A, similar to the operation device 1, is worn on one hand of the user US, and transmits operation information according to an operation of the user US to an information processing device PD on a wireless basis. The operation device 1A includes an operation device 1LA that is worn on the left hand LH of the user US, and an operation device 1RA that is worn on the right hand RH of the user US. The operation device 1LA and the operation device 1RA have mirror symmetric structures. Note that, similar to the operation device 1, the operation device 1A may not necessarily include the operation devices 1LA and 1RA, and it is sufficient to include one operation device of the operation devices 1LA and 1RA.

The operation device 1LA will be described below, while description of the operation device 1RA will be omitted.

Figure 17:
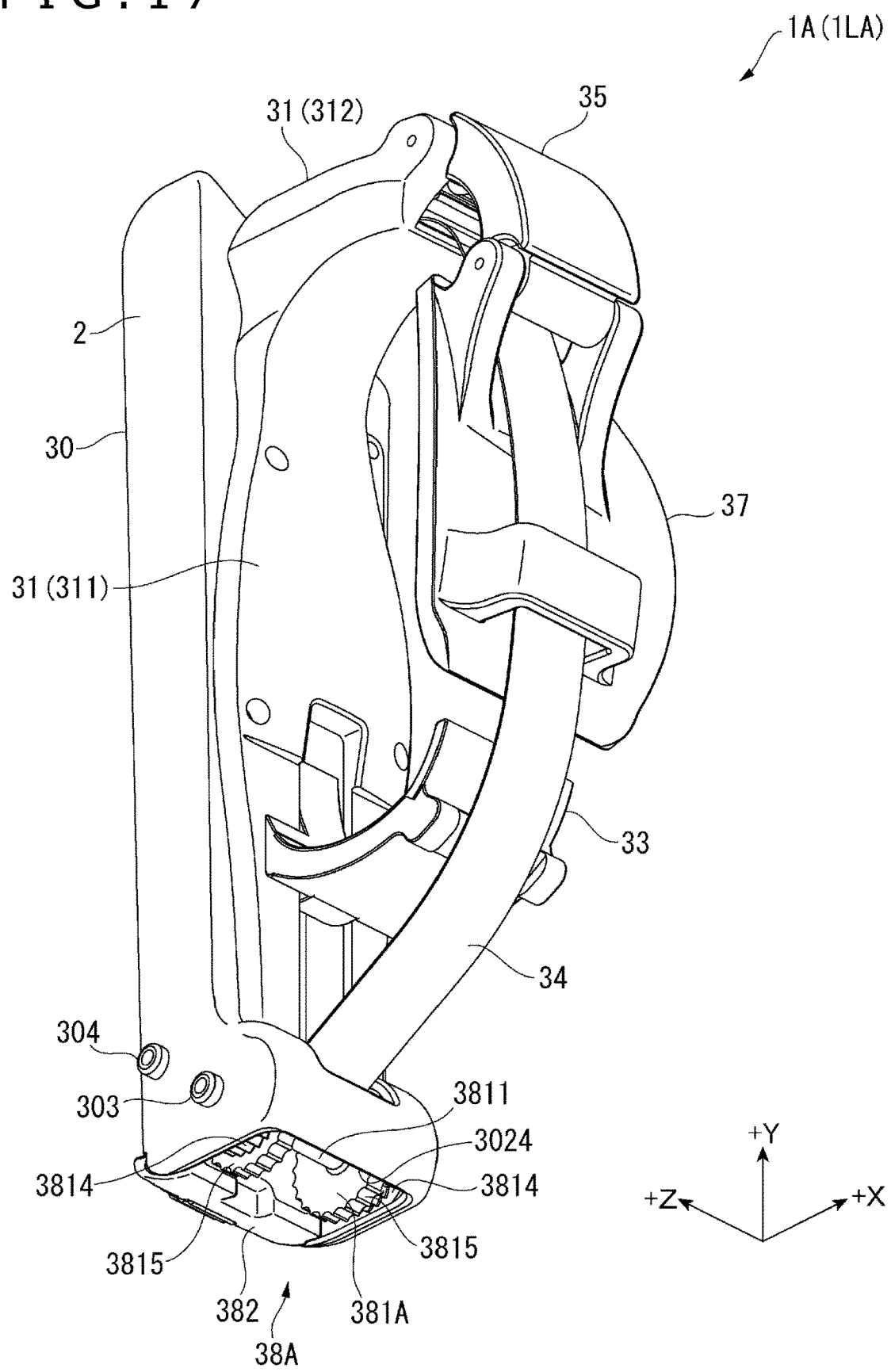
FIG. 17 is a perspective view depicting the operation device in the second embodiment.

FIG. 17 is a perspective view depicting the operation device 1LA.

The operation devices 1LA and 1RA have a configuration and a function similar to those of the operation devices 1L and 1R, respectively, except for having a take-up mechanism 38A in place of the take-up mechanism 38. In other words, a wearing member 2 possessed by the operation devices 1LA and 1RA according to the present embodiment has the take-up mechanism 38A in place of the take-up mechanism 38. In addition, as illustrated in FIG. 17, the take-up mechanism 38A has a configuration and a function similar to those of the take-up mechanism 38 except for having a reel 381A in place of the reel 381.

The reel 381A has a configuration and a function similar to those of the reel 381 except for having gear sections 3815 in place of the roll sections 3812 and the anti-slip sections 3813. In other words, the reel 381A has a shaft section 3811, meshing sections 3814, and the gear sections 3815.

The gear sections 3815 are provided at positions similar to the layout positions of the roll sections 3812 of the shaft section 3811. A plurality of gear teeth meshing with a roller 74 of a take-up device 5L described later are provided at a circumferential surface of the gear section 3815. Though detailed later, in a state in which the gear section 3815 and a gear section 742 of the roller 74 are meshed with each other, the roller 74 is rotated and the reel 381A is thereby rotated, and the belt 34 is taken up.

(Configuration of Cradle)

The cradle 4 is configured such that the operation devices 1LA and 1RA can be disposed, and, for example, the take-up mechanism 38A of the operation devices 1LA and 1LB is operated to take up the belt 34.

As depicted in FIG. 15, the cradle 4 includes an exterior housing 41 constituting an exterior part.

(Configuration of Exterior Housing)

The exterior housing 41 is formed in a substantially rectangular parallelepiped shape. An upper surface section 41A of the exterior housing 41 has an opening 41L into which a part of the operation device 1LA is inserted, and an opening 41R into which a part of the operation device 1RA is inserted. Parts of the operation devices 1LA and 1RA inserted in disposing sections 622 (see FIG. 19) of the take-up devices 5L and 5R provided in the exterior housing 41 are inserted in and passed through the openings 41L and 41R.

(Configuration of Take-Up Device)

Figure 18:
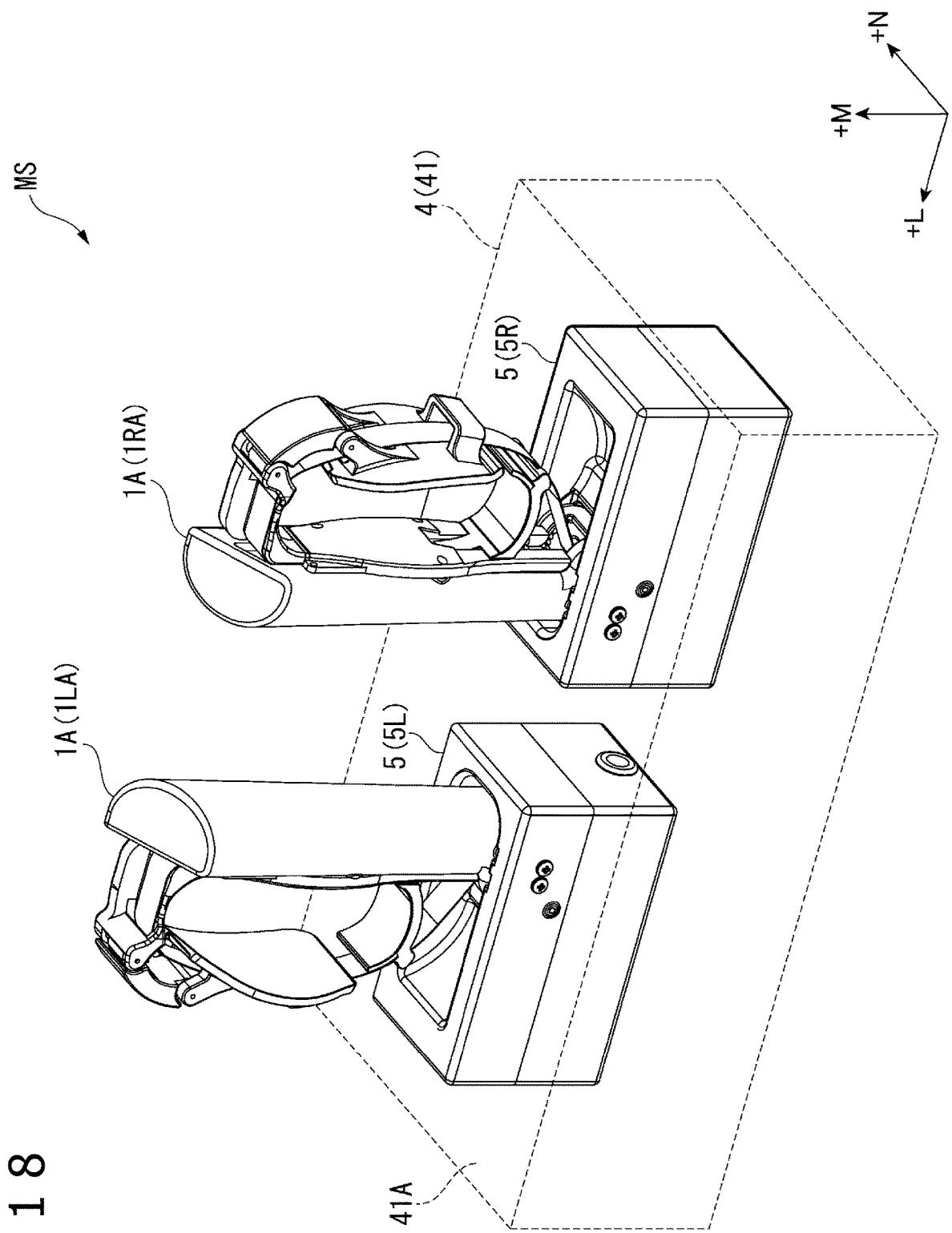
FIG. 18 is a perspective view depicting a take-up device provided in an external housing in the second embodiment.

FIG. 18 is a perspective view depicting the take-up devices 5 (5L, 5R) provided in the exterior housing 41. The cradle 4, in addition to the exterior housing 41, further includes the take-up devices 5 (5L, 5R) provided in the exterior housing 41.

The take-up devices 5 (5L, 5R) cause the take-up mechanism 38A of the operation devices 1A (1LA, 1RA) to take up the belt 34 according to an operation of the user US, and release the belt 34 taken up. As depicted in FIG. 18, the take-up devices 5 include the take-up device 5L that operates the take-up mechanism 38A of the operation device 1LA, and the take-up device 5R that operates the take-up mechanism 38A of the operation device 1RA. In other words, the take-up device 5L is a left take-up device where the operation device 1LA for the left hand inclusive of the wearing member 2 worn on the left hand LH of the user US is disposed. In addition, the take-up device 5R is a right take-up device where the operation device 1RA for the right hand inclusive of the wearing member 2 worn on the right hand RH of the user US is disposed. Note that the take-up devices 5 may not necessarily include the take-up devices 5L and 5R, and it is sufficient to include one take-up device of the take-up devices 5L and 5R. The take-up devices 5 constitute a wearing system MS, together with the wearing member 2 of the operation device 1A.

While the take-up device 5L will be described in detail below, description of the take-up device 5R which has a mirror symmetric structure in relation to the take-up device 5L will be omitted.

Figure 19:
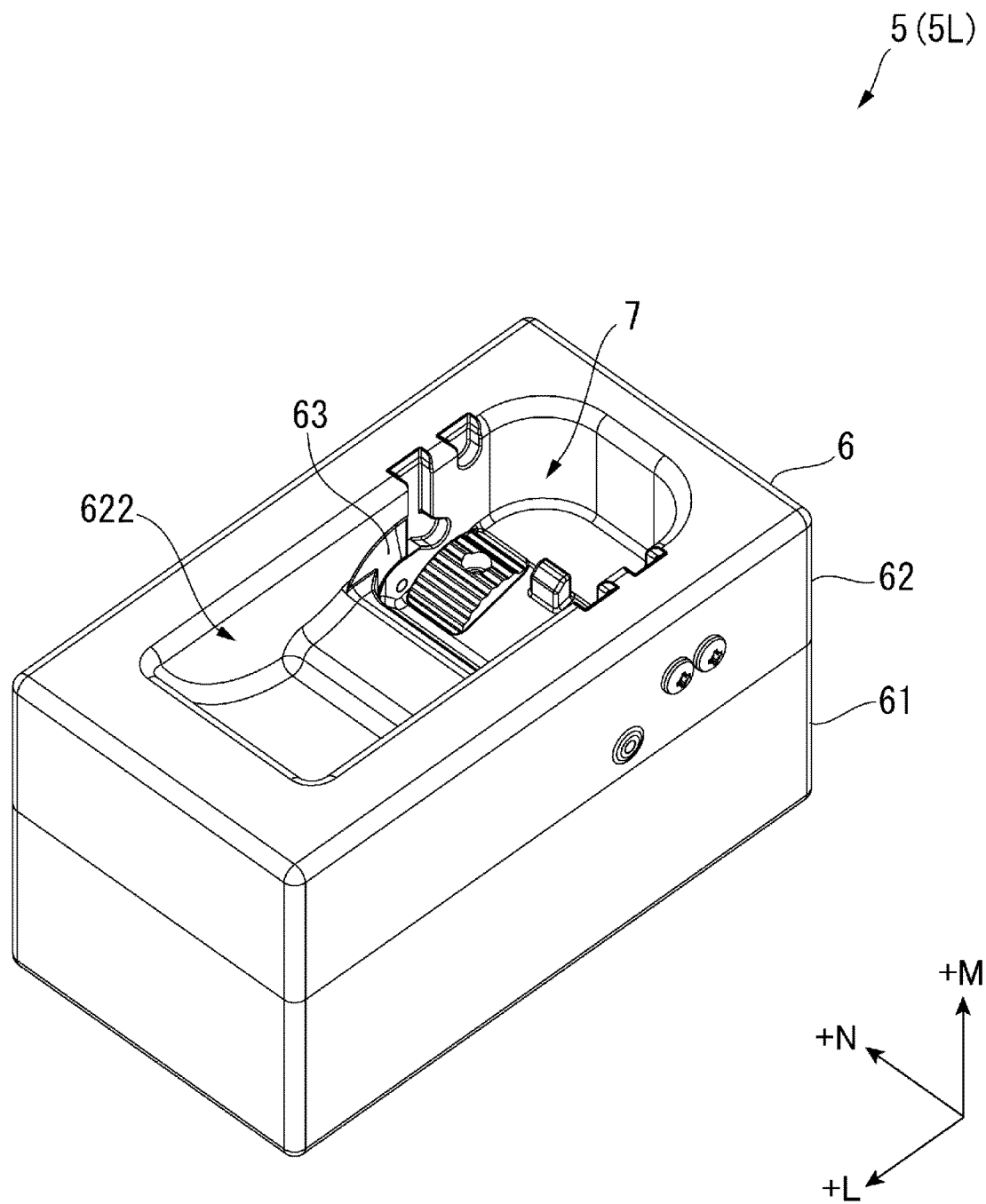
FIG. 19 is a perspective view depicting the take-up device in the second embodiment.

FIG. 19 is a perspective view depicting the take-up device 5L.

As illustrated in FIG. 19, the take-up device 5L includes a substantially rectangular parallelepiped shaped housing 6, and a driving section 7 disposed in the housing 6. In addition, though the details will be described later, the take-up device 5L includes a feeding section 81, a communication section 82, and a control section 83 (see FIG. 26).

In the following description, mutually orthogonal three directions will be a +L direction, a +M direction, and a +N direction. The left direction of the cradle 4 when the cradle 4 is viewed from the front side will be the +L direction, the height direction of the cradle 4 will be the +M direction, and the depth direction of the cradle 4 will be the +N direction. In addition, though illustration is omitted, the direction opposite to the +L direction will be a −L direction, the direction opposite to the +M direction will be a −M direction, and the direction opposite to the +N direction will be a −N direction.

Note that the direction in which the operation device 1LA is inserted into the take-up device 5L is the −M direction. In addition, in a state in which the operation device 1LA is disposed in the take-up device 5L, a +X direction, a +Y direction, and a +Z direction in regard of the operation device 1LA are respectively parallel to the +L direction, the +M direction, and the +N direction.

(Configuration of Housing)

The housing 6 has a first housing 61 and a second housing 62 that are combined with each other, and a rising mechanism 63 provided in the second housing 62.

(Configuration of First Housing)

Figure 20:
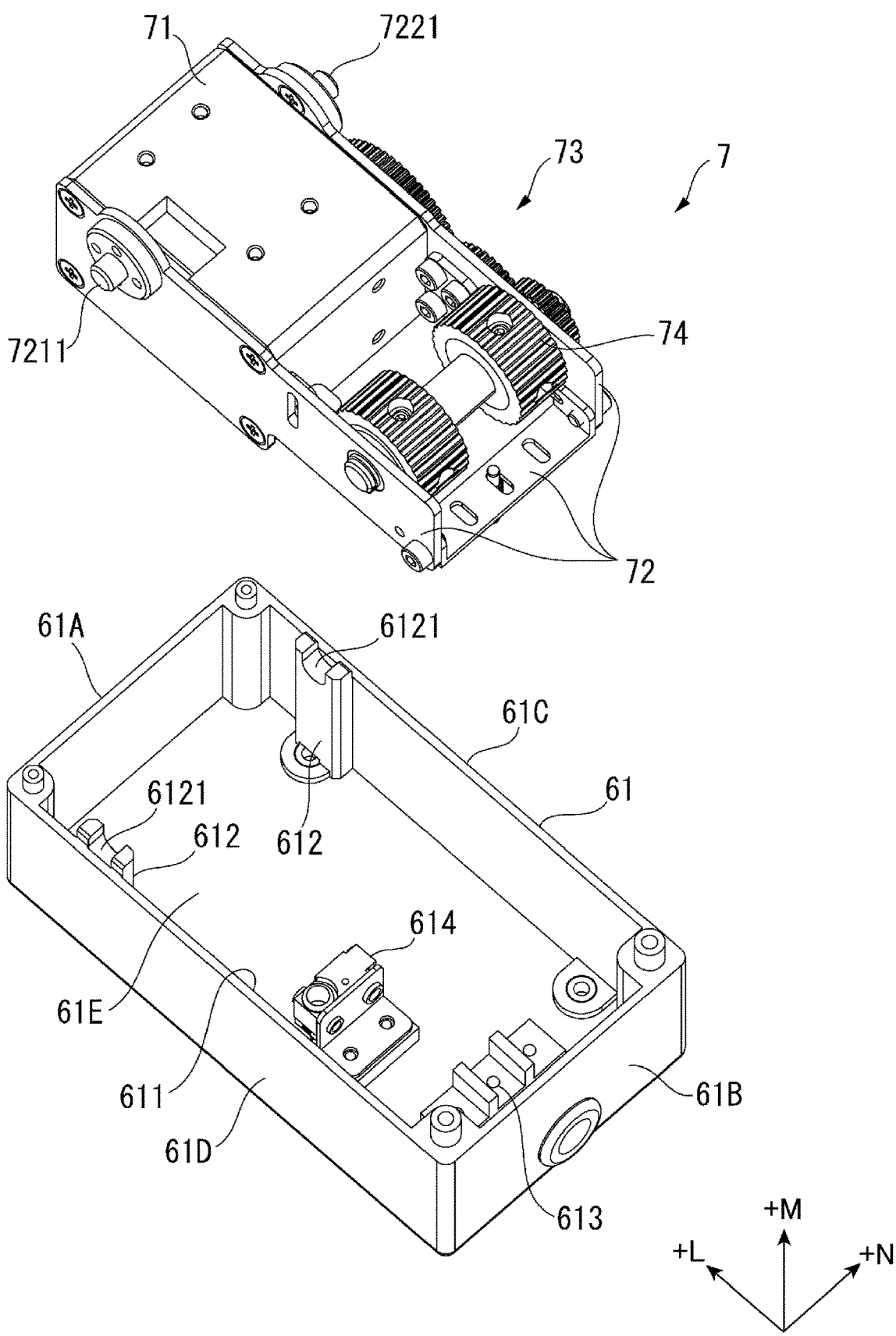
FIG. 20 is a perspective view depicting a first housing and a driving section in the second embodiment.

FIG. 20 is a perspective view of the first housing 61 and the driving section 7 as viewed from the +M direction. The first housing 61 is an accommodating member that accommodates a site in the −M direction of the driving section 7. As depicted in FIG. 20, the first housing 61 is formed in a box-like shape having a side surface section 61A located in the +L direction, a side surface section 61B located in the −L direction, a side surface section 61C located in the +N direction, a side surface section 61D located in the −N direction, and a bottom surface section 61E located in the −M direction. Such a first housing 61 has an opening 611, rising sections 612, a hole 613, and a detection section 614.

The opening 611 is an opening for disposing the driving section 7 in the first housing 61 and has end edges defined by the side surface sections 61A to 61D. A part of the opening 611 is closed by attachment of the second housing 62 to the first housing 61.

The rising sections 612 rise from the bottom surface section 61E at sites in the +L direction of each inner surface of each side surface section 61C or 61D. Each rising section 612 has a substantially U-shaped shaft support section 6121 that rotatably supports shaft sections 7211 and 7221 of the driving section 7. The shaft support section 6121 is located further in the +M direction relative to end edges in the +M direction of the side surface sections 61C and 61D.

The hole 613 is provided in a site in the −L direction of the bottom surface section 61E. The hole 613 is a hole in which a rod-shaped member SM described later is inserted. The detection section 614 is provided substantially in the center of the bottom surface section 61E. The detection section 614 detects the position of the driving section 7. In the present embodiment, the detection section 614 is a switch that is put into an ON state while pressed by a pressing section 7213 (see FIG. 23) of the driving section 7 and is put into an OFF state when the pressing is released. In other words, the detection section 614 detects the rotated state of the driving section 7 by the pressed state by the pressing section 7213. When the detection section 614 is changed over to the ON state by being pressed, a motor 71 is driven.

(Configuration of Second Housing)

Figure 21:
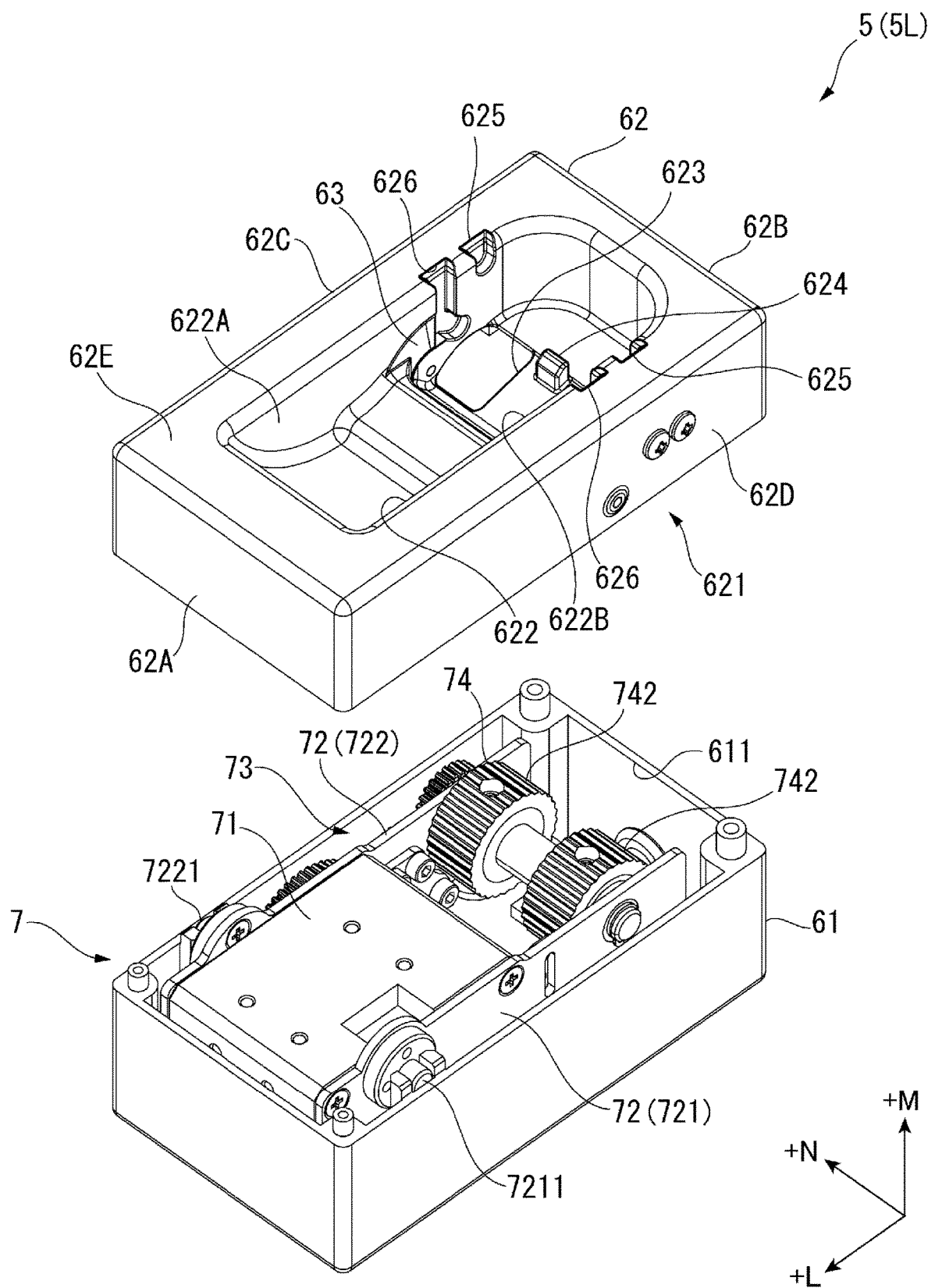
FIG. 21 is a perspective view depicting the take-up device with a second housing separated in the second embodiment.

FIG. 21 is a perspective view depicting the take-up device 5L with the second housing 62 separated in the +M direction.

As illustrated in FIG. 21, the second housing 62 is combined with the first housing 61 such as to cover a part of the driving section 7 disposed in the housing 6 in the +M direction. The second housing 62 has a side surface section 62A located in the +L direction, a side surface section 62B located in the −L direction, a side surface section 62C located in the +N direction, a side surface section 62D located in the −N direction, and a top surface section 62E located in the +M direction. Such a second housing 62 has an opening 621, a disposing section 622, an opening 623, a releasing section 624, and groove sections 625 and 626.

The opening 621 is an opening that has end edges defined by the side surface sections 62A to 62D and opens in the −M direction. When the first housing 61 and the second housing 62 are combined with each other, a site in the +M direction of the driving section 7 is disposed in the second housing 62 through the opening 621.

The disposing section 622 is a recess formed in the top surface section 62E such as to be recessed in the −M direction. The operation device 1LA is disposed in the disposing section 622 such that an end portion in the −Y direction is inserted.

The opening 623 is formed in a bottom portion of the disposing section 622. The opening 623 is an opening that causes a gear section 742 of the driving section 7 to be exposed in the +M direction.

Though details will be described later, the releasing section 624 is provided at such a position as to press the first contact surface 3824 of the lever 382 when the operation device 1LA disposed in the disposing section 622 is rotated in the −L direction. When the releasing section 624 presses the first contact surface 3824, as described above, the lever 382 is separated from the reel 381A, and the belt 34 is slackened.

The groove sections 625 are formed respectively along the +M direction at sites in the −L direction of inner surfaces 622A and 622B opposed to each other along the +N direction, of inner surfaces of the disposing section 622. A projecting section 304 is inserted into each groove section 625 when a part of the operation device 1LA is disposed in the disposing section 622.

Note that the projecting section 304 disposed along the +N direction in the groove section 625 becomes a rotary shaft when the operation device 1LA is rotated within the disposing section 622.

The groove sections 626 are formed respectively at sites in the +L direction in relation to the groove sections 625 of the inner surfaces 622A and 622B. A projecting section 303 is inserted in each groove section 626 when a part of the operation device 1LA is disposed in the disposing section 622. The groove section 626 is formed in a shape according to a locus of the projecting section 303 when the operation device 1LA is rotated with the projecting section 304 as a center.

A part of a rising mechanism 63 that rises the operation device 1LA is disposed, in contact with the projecting section 303, in such a groove section 626.

Figure 22:
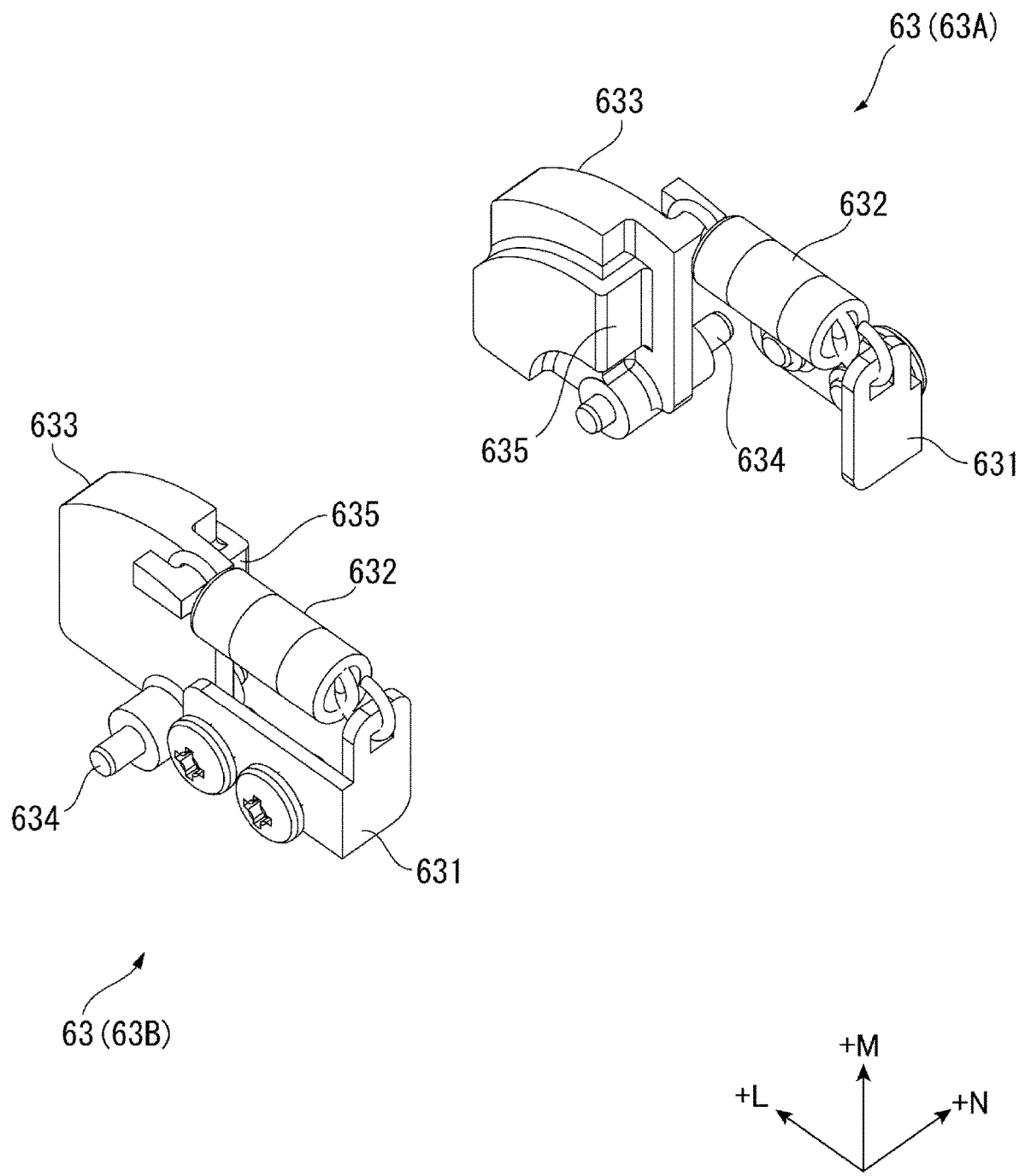
FIG. 22 is a perspective view depicting a rising mechanism in the second embodiment.

FIG. 22 is a perspective view depicting the rising mechanism 63.

The rising mechanism 63 is for rising the operation device 1LA disposed in the disposing section 622, and two rising mechanisms 63 are provided in the second housing 62 such as to clamp the disposing section 622 in the +N direction. In other words, of the two rising mechanisms 63, a rising mechanism 63A on one side is provided at an inner surface of the side surface section 62C, and a rising mechanism 63B on the other side is provided at an inner surface of the side surface section 62D.

The rising mechanisms 63A and 63B each have a fixing section 631, a biasing section 632, and a lever 633, as depicted in FIG. 21.

The fixing sections 631 are fixed respectively to inner surfaces of the side surface sections 62C and 62D. The biasing section 632 causes a biasing force for rising the operation device 1LA to act on the lever 633. One end of the biasing section 632 is locked to the fixing section 631. The other end of the biasing section 632 is locked to the lever 633. In the present embodiment, a tensile coil spring is used as such a biasing section 632.

The levers 633 have shaft sections 634 and are rotatably supported on the side surface sections 62C and 62D such as to be rotatable with the shaft sections 634 as a center. The levers 633 have a contact section 635 disposed in the groove section 626 and making contact with the projecting section 303 of the operation device 1LA, and rise the operation device 1LA by a biasing force of the biasing section 632. When the operation device 1LA is rotated in the −L direction within the disposing section 622, the projecting section 303 makes contact with the contact section 635, and the lever 633 presses back the projecting section 303 in the +L direction by the biasing force of the biasing section 632, whereby the operation device 1LA is caused to rise in the disposing section 622.

(Configuration of Driving Section)

Figure 23:
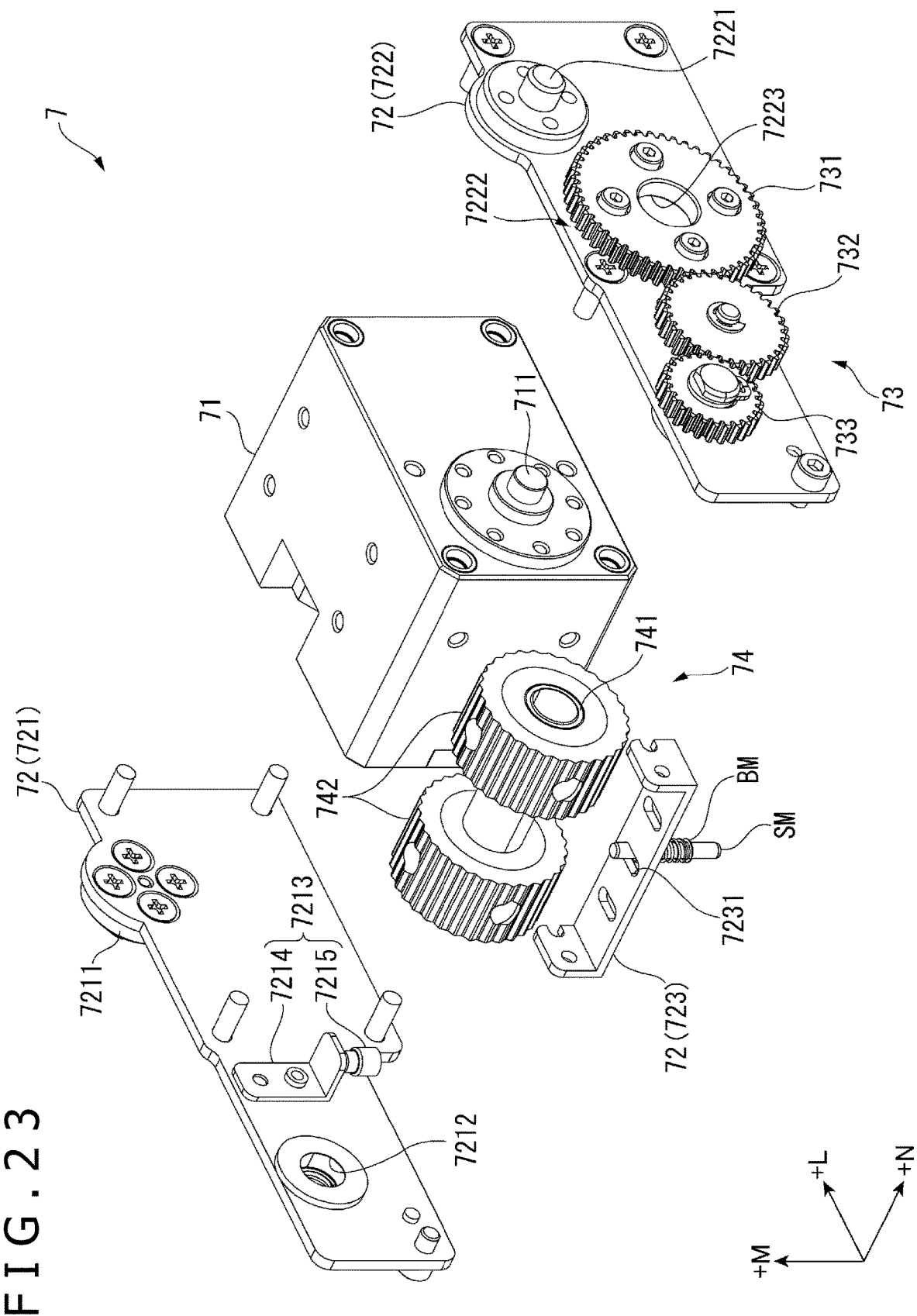
FIG. 23 is an exploded perspective view depicting the driving section in the second embodiment.
Figure 24:
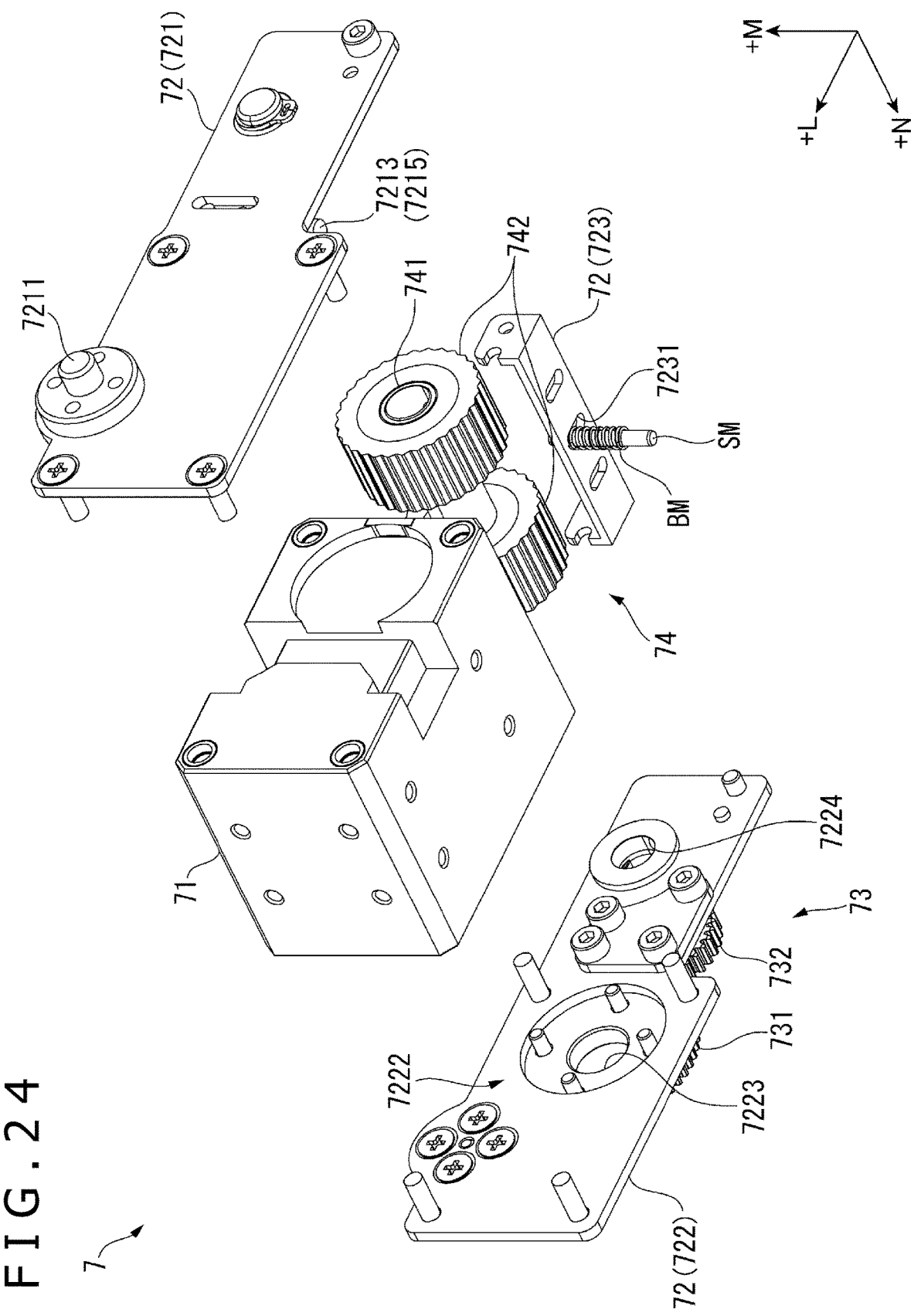
FIG. 24 is another exploded perspective view depicting the driving section in the second embodiment.

FIGS. 23 and 24 are exploded perspective views depicting the driving section 7. More in detail, FIG. 23 is an exploded perspective view of the driving section 7 as viewed from the +N direction in the +M direction, whereas FIG. 24 is a perspective view of the driving section 7 as viewed from the −N direction in the −M direction.

The driving section 7, when the operation device 1LA is rotated in the +L direction from an insertion position in the disposing section 622, drives to rotate the reel 381A, thereby taking up the belt 34 on the reel 381A. As depicted in FIGS. 23 and 24, the driving section 7 has the motor 71, a frame 72, a transmission mechanism 73, and a roller 74.

(Configuration of Motor)

The motor 71 generates a driving force for rotating the roller 74, in other words, a take-up force for rotating the reel 381A to take up the belt 34. Specifically, the motor 71 rotates a gear 731 constituting the transmission mechanism 73. The motor 71 has a spindle 711 projecting in the +N direction. An operation of such a motor 71 is controlled by the control section 83, though details will be described later.

(Configuration of Frame)

The frame 72 has clamping pieces 721 and 722 and a connection piece 723.

The clamping pieces 721 and 722 clamp the motor 71 in the +N direction. More in detail, the clamping piece 721 located in the −N direction and the clamping piece 722 located in the +N direction are fixed to the motor 71 by screws. The clamping piece 721 has a shaft section 7211, a recess 7212, and a pressing section 7213.

The shaft section 7211 is located in the +L direction of the clamping piece 721 and projects in a cylindrical shape in the −N direction from the clamping piece 721. The shaft section 7211 is a site which becomes a rotary shaft of the driving section 7 by being supported by the shaft support section 6121.

The recess 7212 is located in the −L direction of the clamping piece 721 and is recessed in the −N direction. A shaft 741 constituting the roller 74 is inserted in the recess 7212.

The pressing section 7213 has a fixing section 7214 fixed substantially in the center of a surface in the +N direction of the clamping piece 721, and a projecting section 7215 projecting in the −M direction from the fixing section 7214. The pressing section 7213 presses the detection section 614 by the projecting section 7215 in the case where the driving section 7 is rotated.

The clamping piece 722 has a shaft section 7221 and a disposing section 7222.

The shaft section 7221 is located in the +L direction of the clamping piece 722 and projects in a cylindrical shape in the +N direction from the clamping piece 722. Like the shaft section 7211, the shaft section 7221 is a site which becomes a rotary shaft of the driving section 7 by being supported by the shaft support section 6121. The disposing section 7222 is located substantially in the center in the +L direction of the clamping piece 722. Gears 731 to 733 constituting the transmission mechanism 73 are disposed at the disposing section 7222. The disposing section 7222 has a hole 7223 which penetrates the clamping piece 722 along the +N direction and in and through which the spindle 711 of the motor 71 is inserted and passed from the −N direction. In addition, as depicted in FIG. 24, the disposing section 7222 has a hole 7224 which is located in the −L direction of the clamping piece 722 and into which the shaft 741 of the roller 74 is inserted.

The connection piece 723 connects end portions in the −L direction of the clamping pieces 721 and 722. The connection piece 723 has a slot 7231 having a long diameter in the +L direction substantially in the center in the +N direction. A rod-shaped member SM in and through which the biasing member BM is inserted and passed is inserted in the slot 7231.

One end of the rod-shaped member SM is inserted in the slot 7231, whereas the other end of the rod-shaped member SM is inserted in the hole 613 located in the bottom surface section 61E of the first housing 61.

The biasing member BM makes contact with a surface in the −M direction of the connection piece 723 and makes contact with an inner surface of the bottom surface section 61E. The biasing member BM exerts a biasing force for pressing back the driving section in the +M direction when the driving section 7 is rotated in the −M direction with the shaft sections 7211 and 7221 as a center. In the present embodiment, a compression coil spring is adopted as the biasing member BM.

(Configuration of Transmission Mechanism)

The transmission mechanism 73 has the gears 731 to 733 that transmit a rotational force of the motor 71 to the roller 74 and rotates the roller 74 by the rotation of the gears 731 to 733. The transmission mechanism 73 is located in the +N direction in relation to the clamping piece 722 and is disposed at the disposing section 7222. The gear 731 is fixed to the spindle 711 inserted in and passed through the hole 7223.

The gear 732 meshes with the gear 731.

The gear 733 meshes with the gear 732. The gear 733 is integrated with the shaft 741 inserted in and passed through the hole 7224 along the +N direction.

Therefore, when the spindle 711 is rotated, the shaft 741 integrated with the gear 733 is rotated through the gears 731 to 733.

Note that, of the gears 731 to 733, the gear the largest in outside diameter is the gear 731, and the gear the smallest in outside diameter is the gear 733. In other words, the transmission mechanism 73 in the present embodiment is a speed increasing mechanism.

(Configuration of Roller)

The roller 74 rotates the reel 381A in contact therewith to thereby take up the belt 34 when the operation device 1A is disposed in the take-up device 5 and the driving section 7 is pressed down by the operation device 1A and is rotated in the −M direction. The roller 74 has a shaft 741 and two gear sections 742.

The shaft 741 is a shaft-shaped member disposed along the −N direction and is a member which supports the two gear sections 742 and which becomes a rotary shaft for the two gear sections 742. An end portion in the −N direction of the shaft 741 is inserted in the recess 7212, while an end portion in the +N direction is inserted in the hole 7224 of the clamping piece 722. The shaft 741 is integrated with the gear 733, as described above, and the roller 74 as a whole is rotated according to the rotation of the gear 733.

The two gear sections 742 are provided on one end side and the other end side of the shaft 741. A circumferential surface of each gear section 742 is formed with a plurality of teeth that mesh with the gear section 3815 of the reel 381A, and the teeth of the respective gear sections 742 and teeth of the corresponding gear section 3815 mesh with each other, whereby the roller 74 and the reel 381A mesh with each other. With the motor 71 driven to rotate the roller 74 in this state, the reel 381A takes up the belt 34.

(Wearing of Operation Device on Hand by Take-Up Device)

Figure 25:
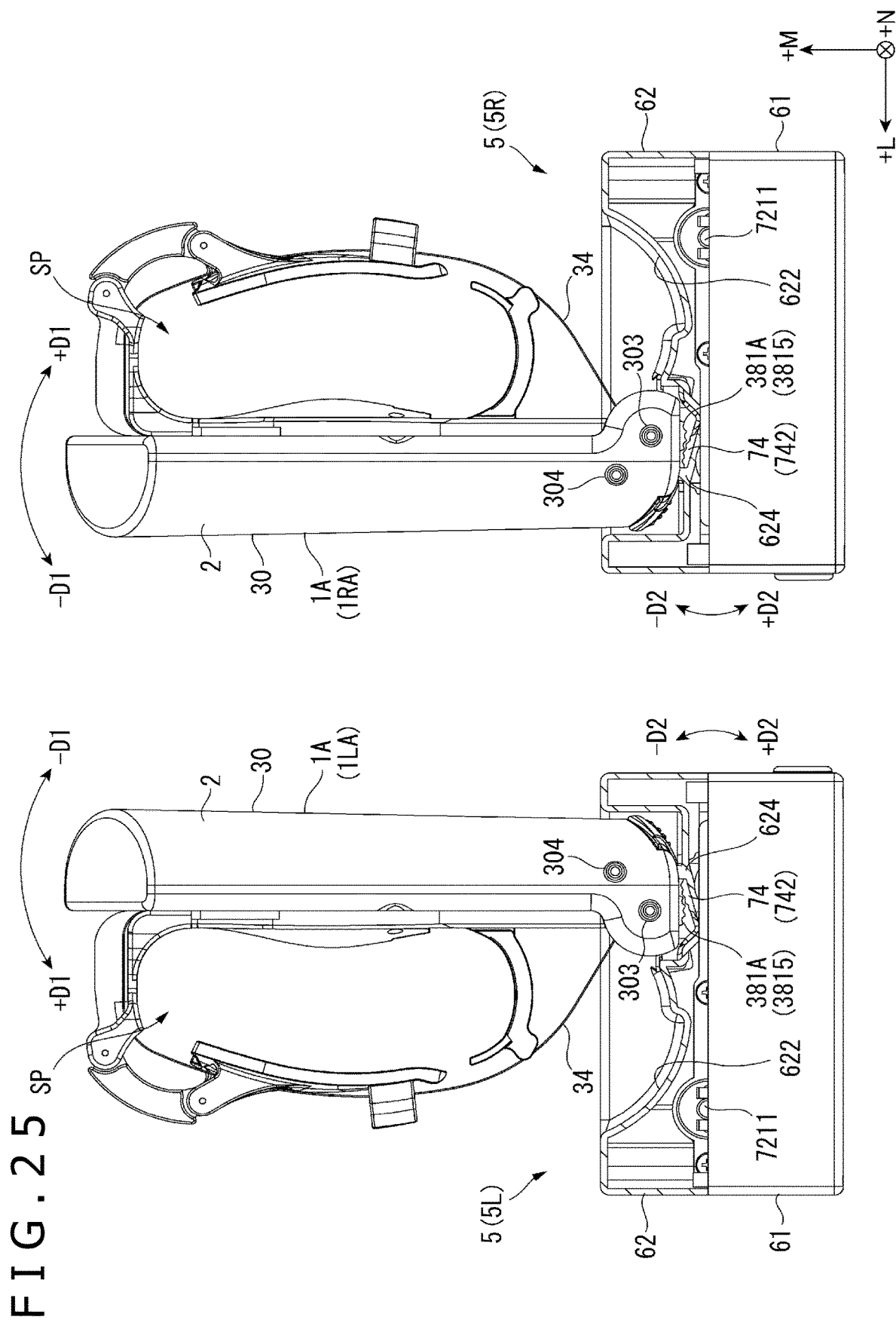
FIG. 25 is a front view depicting the operation device and the take-up device in the second embodiment.

FIG. 25 is a front view of the operation devices 1LA and 1RA and the take-up devices 5L and 5R as viewed from the −N direction. Note that, in FIG. 25, the second housing 62 of the take-up devices 5L and 5R is depicted in section. In addition, in FIG. 25, illustration of the configuration other than the take-up devices 5L and 5R of the cradle 4 is omitted.

As depicted in FIG. 25, in the cradle 4, the take-up device 5L is disposed in the +L direction, whereas the take-up device 5R is disposed in the −L direction. The take-up device 5L has the motor 71 disposed in the direction of being located in the +L direction in relation to the roller 74, whereas the take-up device 5R has the motor 71 disposed in the direction of being located in the +L direction in relation to the roller 74. In other words, the take-up device 5L and the take-up device 5R are disposed such as to face each other in the +L direction and be in mirror symmetry in regard of the MN plane.

In a state in which an end portion in the −Y direction of the operation device 1LA is inserted in the disposing section 622 of the take-up device 5L, the reel 381A of the operation device 1LA and the roller 74 of the take-up device 5L mesh with each other. In addition, in a state in which an end portion in the −Y direction of the operation device 1RA is inserted in the disposing section 622 of the take-up device 5R, the reel 381A of the operation device 1RA and the roller 74 of the take-up device 5R mesh with each other. In this state, the projecting sections 304 becoming the rotary shafts for the operation devices 1LA and 1RA are disposed in the groove sections 625 (see FIG. 21) of the take-up devices 5L and 5R, whereas the projecting sections 303 are disposed in the groove sections 626 (see FIG. 21) of the take-up devices 5L and 5R.

In the case where the user US wears the operation devices 1LA and 1RA in this state, the user US inserts the left hand LH into the space SP of the operation device 1LA and grasps the housing 30 and the support member 31 of the operation device 1LA by the left hand LH, and inserts the right hand RH into the space SP of the operation device 1RA and grasps the housing 30 and the support member 31 of the operation device 1RA by the right hand RH. Then, when the operation devices 1LA and 1RA are rotated in a +D1 direction which is the direction for separating away with the respective projecting sections 304 as centers, the rollers 74 are pressed in the −M direction by the reels 381A in the take-up devices 5L and 5R, and the driving sections 7 of the take-up devices 5L and 5R are rotated in a +D2 direction which is the direction in which the end portions on the roller 74 side of the driving sections 7 are moved in the −M direction, with the shaft sections 7211 and 7221 as centers. In other words, the end portions on the roller 74 side of the driving sections 7 are pressed down in the −M direction.

When the driving section 7 is rotated in the +D2 direction, the pressing section 7213 presses the detection section 614. When a detection signal of the ON state is outputted from the detection section 614 thus pressed, the motor 71 is driven, and a rotational force of the spindle 711 is transmitted to the roller 74 through the transmission mechanism 73. As a result, the roller 74 is rotated.

When the roller 74 is rotated, the reel 381A meshing with the roller 74 is rotated in the take-up direction of the belt 34, to take up the belt 34. According as the belt 34 is taken up described above, the sliding member 33 is pulled up in the +Y direction, and the space SP is reduced in diameter. As a result, the sliding member 33 of the operation device 1LA makes contact with a site corresponding to the hypothenar of the left hand LH, and the contact member 37 of the operation device 1LA makes contact with the back of the left hand LH. Similarly, the sliding member 33 of the operation device 1RA makes contact with a site corresponding to the hypothenar of the right hand RH, and the contact member 37 of the operation device 1RA makes contact with the back of the right hand RH. As a result, the operation devices 1LA and 1RA fit to the left hand LH and the right hand RH. Note that it is natural that the wearing of the operation device 1LA on the left hand LH and the wearing of the operation device 1RA on the right hand RH may not necessarily be performed simultaneously, but may be carried out individually.

When the operation devices 1LA and 1RA are returned to the positions before rotation in the +D1 direction in a state in which the operation devices 1LA and 1RA are fitted to the left hand LH and the right hand RH, the driving section 7 is rotated in the −D2 direction which is a direction opposite to the +D2 direction, and the pressing of the detection section 614 by the pressing section 7213 is released. As a result, the motor 71 is stopped. Such a control of the operation of the motor 71 will be described in detail later.

(Release of Operation Device)

When the operation devices 1LA and 1RA are rotated in a direction for mutually approaching, namely, in the −D1 direction which is a direction opposite to the +D1 direction with the projecting section 304 as a center, in a state in which the operation device 1LA worn on the left hand LH is disposed in the take-up device 5L and the operation device 1RA worn on the right hand RH is disposed in the take-up device 5R, as depicted in FIG. 25, the releasing sections 624 provided in the disposing sections 622 of the take-up devices 5L and 5R press the first contact surfaces 3824 of the operation devices 1LA and 1RA in a direction for separating away from the reel 381A. As a result, the lever 382 is separated away from the reel 381A, so that restriction of rotation of the reel 381A in the direction opposite to the take-up direction of the belt 34 is released.

In this state, the sliding member 33 is pulled in the −Y direction by the first biasing member 32, and therefore, the belt 34 connected to the sliding member 33 is slackened. As a result, the space SP in each of the operation devices 1LA and 1RA is enlarged in diameter, and the left hand LH and the right hand RH can be detached from the operation devices 1LA and 1RA. It is natural that, similarly to the wearing, the release of the operation device 1LA from the left hand LH and the release of the operation device 1RA from the right hand RH may not necessarily be performed simultaneously, but may be carried out individually.

Note that the operation device 1LA detached from the left hand LH rises in the +M direction at the disposing section 622, by the pressing of the projecting section 303 by the lever 633 of the rising mechanism 63. The same applies also to the operation device 1RA.

(Other Configuration of Take-Up Mechanism)

Figure 26:
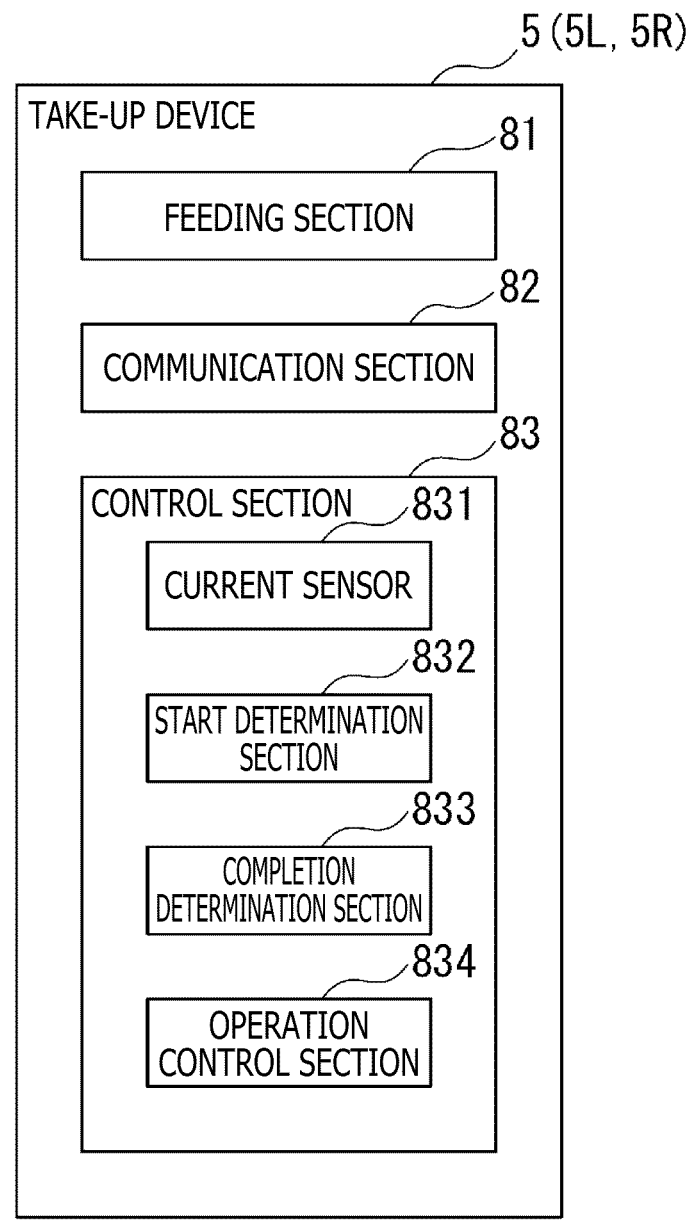
FIG. 26 is a block diagram depicting a configuration of the take-up device in the second embodiment.

FIG. 26 is a block diagram depicting the configuration of the take-up device 5 (5L, 5R).

The take-up device 5 (5L, 5R) includes a feeding section 81, a communication section 82, and a control section 83, other than the abovementioned configuration, as depicted in FIG. 26.

The feeding section 81 supplies the operation device 1A disposed in the take-up device 5 with electric power for charging a secondary battery possessed by the operation device 1A, under the control by the control section 83. The communication section 82 communicates with the operation device 1A disposed in the take-up device 5 to transfer information with the operation device 1A, under the control by the control section 83.

Note that the take-up device 5 may not necessarily include the feeding section 51 and the communication section 52. In other words, the take-up device 5 may include one of the feeding section 51 and the communication section 52 and may include neither of the feeding section 51 and the communication section 52.

The control section 83 controls the operation of the take-up device 5. The control section 83 controls the feeding section 81 and the communication section 82. In addition, for example, the control section 83 controls the operation of the motor 71. The control section 83 has a current sensor 831, a start determination section 832, a completion determination section 833, and a driving control section 834.

The current sensor 831 detects a motor current when the motor 71 is driving.

The start determination section 832 determines whether or not it is a starting timing of the motor 71.

Specifically, with the driving section 7 is rotated by the operation device 1A, in the case where the detection section 614 is depressed by the pressing section 7213 and a detection signal in an ON state (for example, a signal at a High level) is inputted from the detection section 614 to the control section 83, the start determination section 832 determines that it is a starting timing of the motor 71. On the other hand, in the case where the detection section 614 is not depressed and a detection signal in an OFF state (for example, a signal at a Low level) is inputted to the control section 83, the start determination section 832 determines that it is not the starting timing of the motor 71.

The completion determination section 833 determines whether or not take-up of the belt 34 by the reel 381A rotated by the motor 71 has been completed. Specifically, the completion determination section 833 determines whether or not a current value of the motor current detected by the current sensor 831 exceeds a predetermined threshold. Note that, since the magnitude of a load torque exerted on the motor 71 can be inferred from the current value of the motor current, the completion determination section 833 can be said to determine whether or not the take-up of the belt 34 is completed by determining the magnitude of the load torque.

The driving control section 834 controls the operation of the motor 71, based on the results of determination by the start determination section 832 and the completion determination section 833. Specifically, when it is determined by the start determination section 832 that it is the starting timing, the driving control section 834 operates the motor 71, to rotate the roller 74. In addition, when it is determined by the completion determination section 833 that take-up of the belt 34 is completed, the driving control section 834 stops the operation of the motor 71, to stop the roller 74.

(Operation Control Processing of Motor)

Figure 27:
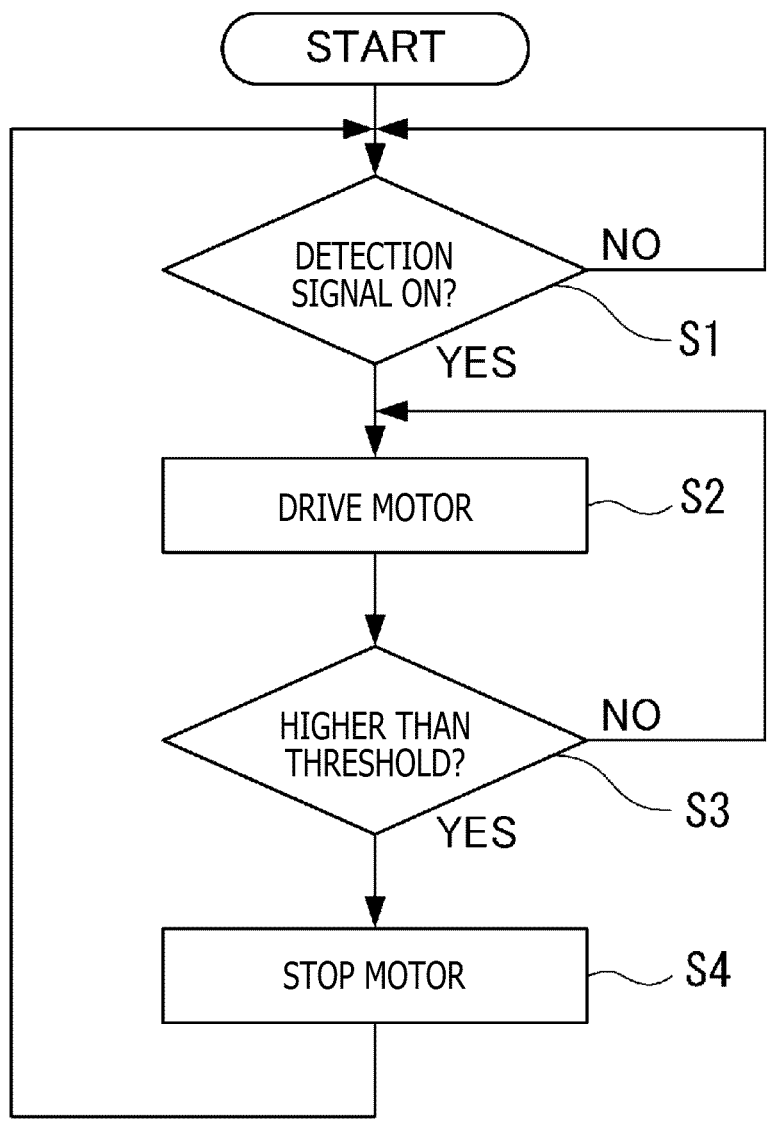
FIG. 27 is a flow chart depicting an operation control processing in the second embodiment.

FIG. 27 is a flow chart depicting an operation control processing of the motor 71 that is executed by the control section 83.

The control section 83 executes the operation control processing depicted in FIG. 27, to control the operation of the motor 71.

In the operation control processing executed by the control section 83, first, the start determination section 832 determines whether or not a detection signal in an ON state is inputted from the detection section 614, in other words, determines whether or not it is the starting timing of the motor 71 (step S1).

In the case where it is determined in the determination processing in step S1 that the detection signal in the ON state has not been inputted, in other words, in the case where it is determined not the starting timing (step S1: NO), the control section 83 executes the step S1 repeatedly.

In the case where it is determined in the determination processing in step S1 that the detection signal in the ON state has been inputted, in other words, in the case where it is determined to be the starting timing (step S1: YES), the driving control section 834 drives the motor 71 (step S2).

Thereafter, the completion determination section 833 determines whether or not the current value of the motor current exceeds a threshold, in other words, determines whether or not take-up of the belt 34 has been completed (step S3).

In the case where it is determined in the determination processing in step S3 that the current value of the motor current is not in excess of the threshold, in other words, in the case where it is determined that the take-up of the belt 34 has not been completed (step S3: NO), the control section 83 returns the processing to step S3.

In the case where it is determined in the determination processing in step S3 that the current value of the motor current is in excess of the threshold, in other words, in the case where it is determined that take-up of the belt 34 has been completed (step S3: YES), the driving control section 834 stops the motor 71 (step S4). Thereafter, the control section 83 returns the processing to step S1. By operating the motor 71, and, hence, the take-up device 5 by such an operation control processing, the operation devices 1LA and 1RA having the wearing member 2 can be worn easily on the left hand LH and the right hand RH.

Such a control section 83 can include a hardware, and, in addition, the start determination section 832, the completion determination section 833, and the driving control section 834 can include a memory storing a program concerning the abovementioned operation control processing and an IC (Integrated Circuit) for reading the program and executing the operation control processing.

(Effect of Second Embodiment)

According to the information processing system according to the present embodiment described above, an effect similar to that of the information processing system SY including the operation device 1 (1L, 1R) depicted in the first embodiment can be produced, and, in addition, the following effects can be produced.

The take-up device 5 (5L, 5R) is for causing the take-up mechanism 38 of the wearing member 2 having the belt 34 wound around one hand of the user US and the take-up mechanism 38 for taking up the belt 34 to take up the belt 34. The take-up device 5L includes the driving section 7 that transmits power for taking up the belt 34 to the take-up mechanism 38, the detection section 614 that detects that the driving section 7 is pressed by the wearing member 2, and the control section 83 that operates the driving section 7 when it is detected by the detection section 614 that the driving section 7 is pressed. In addition, the cradle 4 includes the take-up device 5 (5L, 5R).

According to such a configuration, by an operation of pressing the driving section 7 by the wearing member 2, the belt 34 of the wearing member 2 is taken up by the take-up mechanism 38. Therefore, by performing the abovementioned operation in a state in which the wearing member 2 is grasped by the left hand LH, the belt 34 wound around the left hand LH can be taken up. Therefore, the operation device 1LA including the wearing member 2 can be worn easily on the left hand LH. The same applies to the take-up device 5R having a configuration similar to that of the take-up device 5L.

The take-up device 5L has the disposing section 622 where the operation device 1LA including the wearing member 2 is disposed. The control section 83 of the take-up device 5L operates the driving section 7 when the operation device 1LA disposed at the disposing section 622 is inclined in the +D1 direction and it is detected by the detection section 614 that the driving section 7 is pressed.

According to such a configuration, the driving section 7 can be operated by a simple operation on the operation device 1LA including the wearing member 2 disposed at the disposing section 622. Therefore, an operation for executing the take-up of the belt 34 can be carried out easily. The same applies also to the take-up device 5R having a configuration similar to that of the take-up device 5L.

The take-up device 5L includes the releasing section 624 that releases the taken-up state of the belt 34 by the take-up mechanism 38 when the operation device 1LA disposed at the disposing section 622 is inclined in the −D1 direction which is a direction opposite to the +D1 direction.

According to such a configuration, the taken-up state of the belt 34 can be released by inclining the operation device 1LA in the −D1 direction which is a direction opposite to the +D1 direction which is an operating direction of the operation device 1LA at the time of taking up the belt 34. Therefore, the left hand can be detached easily from the wearing member 2 of the operation device 1LA, and, in addition, the operation of detaching the left hand from the wearing member 2 can be intuitively grasped.

The take-up device 5 includes the rising mechanism 63 that rises the operation device 1A inclined in the −D1 direction.

According to such a configuration, the wearing member 2 detached from the left hand can be restrained from being inclined from the take-up device 5. Therefore, in the case of again wearing the wearing member 2, the wearing member 2 can be worn easily.

The disposing section 622 is a recess into which a part of the wearing member 2 of the operation device 1A is inserted.

According to such a configuration, since part of the wearing member 2 is inserted into the disposing section 622, an operation of wearing the wearing member 2 on one hand and an operation of detaching the wearing member 2 from the one hand can be carried out easily.

The driving section 7 includes the roller 74 meshing with the reel 381A for taking up the belt 34 of the take-up mechanism 38, the motor 71 that generates a rotational force for rotating the roller 74, and the transmission mechanism 73 for transmitting the rotational force generated by the motor 71 to the roller 74. The control section 83 drives the motor 71 when it is detected by the detection section 614 that the driving section 7 is pressed.

According to such a configuration, take-up of the belt 34 can be performed by the driving section 7.

Note that, since the transmission mechanism 73 is a speed increasing gear and the reel 381A can be thereby rotated at a comparatively high speed, the belt 34 can be taken up in a short time.

The take-up device 5 includes the housing 6 accommodating therein the driving section 7 such as to be rotatable around a rotational axis along the +N direction orthogonal to the −M direction which is the pressing direction of the driving section 7 by the wearing member 2. The driving section 7 is rotated with the rotational axis as a center when pressed by the wearing member 2, and the detection section 614 detects a rotated state of the driving section 7 by the pressed state.

According to such a configuration, the rotated state of the driving section 7, in other words, whether or not an operation of taking up the belt 34 is being carried out on the wearing member 2 can be detected properly by the detection section 614.

The take-up device 5 includes the feeding section 81 that supplies the wearing member 2 with electric power, and the communication section 82 that communicates with the wearing member 2.

According to such a configuration, the battery 21 possessed by the wearing member 2 disposed in the take-up device 5 can be charged by the feeding section 81. In addition, information can be transferred between the wearing member 2 and the take-up device 5 by the communication section 82.

The take-up device 5 possessed by the cradle 4 includes the take-up device 5L (left take-up device) in which the operation device 1LA for the left hand inclusive of the wearing member 2 worn on the left hand LH of the user US is disposed, and the take-up device 5R (right take-up device) in which the operation device 1RA for the right hand inclusive of the wearing member 2 worn on the right hand RH of the user US is disposed. The control section 83 of the take-up device 5L operates the driving section 7 of the take-up device 5L when the operation device 1LA is inclined in the +D1 direction for separating away from the take-up device 5R. In addition, the control section 83 of the take-up device 5R operates the driving section 7 of the take-up device 5R when the operation device 1RA is inclined in the +D1 direction for separating away from the take-up device 5L. Besides, in the case where the operation device 1LA is inclined in the −D1 direction for approaching the take-up device 5R and in the case where the operation device 1RA is inclined in the −D1 direction for approaching the take-up device 5L, the belt 34 of the operation devices 1LA and 1RA is slackened.

According to such a configuration, wearing and detachment of the operation devices 1LA and 1RA on and from both hands of the user US can be carried out by respective simple operations.

Note that, in the second embodiment, the take-up of the belt 34 is performed in the case where the operation devices 1LA and 1RA are inclined respectively in the +D1 direction, and the belt 34 is slackened in the case where the operation devices 1LA and 1RA are inclined respectively in the −D1 direction. However, this is not limitative, the belt 34 may be taken up in the case where the operation devices 1LA and 1RA are inclined respectively in the −D1 direction, and the belt 34 may be slackened in the case where the operation devices 1LA and 1RA are inclined respectively in the +D1 direction.

The wearing system MS includes the wearing member 2 worn on one hand of the user US, and the take-up device 5 combined with the wearing member 2. The wearing member 2 has the belt 34 wound around one hand, and the take-up mechanism 38A that takes up the belt 34. The take-up device 5 includes the driving section 7 that transmits power for taking up the belt 34 to the take-up mechanism 38A, the detection section 614 that detects that the driving section 7 is pressed by the wearing member 2, and the control section 83 that operates the driving section 7 when it is detected by the detection section 614 that the driving section 7 is pressed.

According to such a configuration, the operation device 1A including the wearing member 2 can be worn easily on one hand, as described above.

(Modification of Embodiment)

The present invention is not limited to each of the above embodiments, and modifications, improvements and the like within such ranges that the object of the present invention can be achieved are included in the present invention.

In each of the above embodiments, the wearing member 2 includes the take-up mechanism 38 or 38A that takes up the belt 34. However, this is not limitative, and the wearing member 2 may not necessarily include the take-up mechanism 38 or 38A insofar as the belt 34 wound around one hand can be locked. For example, the wearing member may include a locking section for locking the belt 34 by some configuration in place of the take-up mechanism 38, insofar as the state in which the contact section 333 of the sliding member 33 is in contact with one hand can be maintained.

In each of the above embodiments, the circumferential surface of the reel 381 or 381A constituting the take-up mechanism 38 or 38A is said to be exposed on the exterior. However, this is not limitative; for example, the circumferential surface of the reel 381 or 381A may not necessarily be exposed on the exterior, insofar as the belt 34 can be taken up by, for example, operating the take-up mechanism 38 or 38A by an external force. On the other hand, the pin PN1 and the reel 381 or 381A may be integrated with each other, and the take-up mechanism 38 or 38A may be operated by rotating the pin PN1.

In the first embodiment, the anti-slip section 3813 is provided at the circumferential surface of the roll section 3812 of the reel 381. However, this is not limitative, and the anti-slip section 3813 may be absent. In this case, for example, the roll section 3812 is formed of rubber or resin, the frictional resistance of the roll section 3812 can be enhanced even if the anti-slip section 3813 is absent.

In the first embodiment, the reel 381 for taking up the belt 34 has the shaft section 3811, the roll section 3812, the anti-slip section 3813, and the meshing section 3814. In the second embodiment, the reel 381A for taking up the belt 34 has the shaft section 3811, the meshing section 3814, and the gear section 3815. The configurations of these reels 381 and 381A may be combined with each other. In other words, a reel provided with the meshing section 3814, the roll section 3812, and the gear section 3815 from an end portion toward the center of the shaft section 3811 may be adopted. In this case, it is sufficient that the diameter size of the roll section 3812 is larger than the diameter size of the gear section 3815, and the roller 74 is disposed such that the roller 74 meshes with only the gear section 3815.

In each of the above embodiments, the wearing member 2 has the first biasing member 32 that biases the sliding member 33 in the −Y direction. However, this is not limitative, and the first biasing member 32 may be absent. In addition, while the coil springs 321 and 322 are adopted as the first biasing member 32, the number of the coil springs constituting the first biasing member 32 is not limited to two, but may be one or three or more. Further, other biasing member may be adopted as the first biasing member 32.

In each of the above embodiments, the support member 31 of the wearing member 2 is disposed on the palm side, whereas the belt 34 is disposed on the side of the back of a hand. However, this is not limitative, and the orientation of the wearing member relative to one hand is not limited to the above-mentioned.

In each of the above embodiments, the wearing member 2 has the hinge 35, the second biasing member 36, and the contact member 37, and the second biasing member 36 biases the hinge 35 in the direction for enlarging the diameter of the space SP. However, this is not limitative, and at least any one of the hinge 35, the second biasing member 36, and the contact member 37 may not necessarily be present.

In each of the above embodiments, the contact member 37 is wider than the belt 34. However, this is not limitative, and the size in the +Z direction of the contact member 37 may be equal to or less than the size in the +Z direction of the belt 34.

In each of the above embodiments, the belt 34 has the contractible-extendable section 343, and the contractible-extendable section 343 is provided according to the contact member 37. However, this is not limitative, the contractible-extendable section 343 may be absent, and, even in the case where the belt 34 includes the contractible-extendable section 343, the position of the contractible-extendable section 343 may not be a site according to the contact member 37. Note that, since the abovementioned effect cannot be produced if the contractible-extendable section 343 is located at a site which is taken up by the reel 381 or 381A of the belt 34, it is preferable that the contractible-extendable section 343 is located at a site which is not taken up by the take-up mechanism.

In each of the above embodiments, the wearing member 2 has the housing 30 to which the support member 31 is attached, and the battery 21 and the like are provided in the housing 30. However, this is not limitative, and the housing constituting a grasped section grasped by the user US together with the support member 31 may be a part of a device or a part of a member that is worn on the body of the user US by the wearing member. In other words, the wearing member may not necessarily include the housing depicted as an example of the housing 30. On the other hand, the housing 30 may be attached to other member constituting the operation device.

In addition, the wearing member 2 includes the battery 21, the detection section 22, the input section 23, the vibration generation section 24, the communication section 25, and the control section 26. However, this is not limitative, the wearing member 2 may not include at least one of the battery 21, the detection section 22, the input section 23, the vibration generation section 24, the communication section 25, and the control section 26, and may further include other configuration. For example, the wearing member 2 may not include the vibration generation section 24, and may further include a display section.

In addition, even in the case where the wearing member 2 does not include at least one configuration of the battery 21, the detection section 22, the input section 23, the vibration generation section 24, the communication section 25, and the control section 26, these configurations may be provided in the operation device, other than the wearing member 2.

In the second embodiment, the detection section 614 is a switch which is put into an ON state by being pressed by the pressing section 7213 possessed by the driving section 7. However, this is not limitative, and the detection section 614 is not limited in configuration insofar as it can detect the pressed state of the driving section 7 by the wearing member 2. For example, the detection section 614 may be a photosensor. Alternatively, a configuration in which the operation device 1A (1LA, 1RA) directly presses the detection section may be adopted.

In the second embodiment, the take-up device 5 (5L, 5R) has the releasing section 624 that separates the lever 382 from the reel 381A to release the taken-up state of the belt 34 when the operation device 1A (1LA, 1RA) is rotated in the −D1 direction. However, this is not limitative, and the releasing section 624 may be absent.

In the second embodiment, the take-up device 5 (5L, 5R) includes the rising mechanism 63 that rises the wearing member 2 of the operation device 1A (1LA, 1RA) disposed in the disposing section 622. However, this is not limitative, and the rising mechanism 63 may be absent. In addition, even in the case where the take-up device 5 (5L, 5R) has the rising mechanism 63, the configuration of the rising mechanism 63 is not limited to the abovementioned configuration.

In the second embodiment, the disposing section 622 where the wearing member 2 of the operation device 1A (1LA, 1RA) is disposed of the take-up device 5 (5L, 5R) is a recess into which a part of the wearing member 2 is inserted. However, this is not limitative, and the configuration of the disposing section 622 is not limited to the recess insofar as the wearing member 2 can be disposed stably.

In the second embodiment, the driving section 7 includes the motor 71, the frame 72, the transmission mechanism 73, and the roller 74. However, this is not limitative, and the driving section 7 may have other configuration in place of or in addition to these configurations. For example, a roller provided on the spindle 711 of the motor 71 may make direct contact with the reel 381A. In addition, the take-up device 5 (5L, 5R) is configured that when it is detected by the detection section 614 that the driving section 7 is pressed by the wearing member 2 of the operation device 1A, the control section 83 operates the motor 71 of the driving section 7, to take up the belt 34. However, this is not limitative, and the configuration for operating the driving section 7 may be other configuration. For example, the driving section 7 may be driven by reception by the take-up device 5 of operation information transmitted from the wearing member 2 according to an input operation on the input section 23 by the user US. In other words, the detection section 614 may be absent, and a configuration in which the driving section 7 is driven when a part of the wearing member 2 is disposed in the disposing section 622 may be adopted.

In the second embodiment, the take-up devices 5L and 5R are disposed such that the left hand LH and the right hand RH are inserted along the +N direction into the spaces SP possessed by the respective wearing members 2 of the operation devices 1LA and 1RA disposed in the take-up devices 5L and 5R. However, this is not limitative, and the take-up devices 5L and 5R may be disposed such that the insertion direction of the left hand LH into the space SP of the operation device 1LA and the insertion direction of the right hand RH into the space SP of the operation device 1RA intersect each other. In this case, when the take-up devices 5L and 5R are disposed such that the intersecting angle between the insertion direction of the left hand LH and the insertion direction of the right hand RH is an acute angle, it is easy to insert the left hand LH and the right hand RH into the spaces SP of the operation devices 1LA and 1RA, wearing of the operation devices 1LA and 1RA on both hands can be carried out easily, and detachment of the operation devices 1LA and 1RA from both hands can also be carried out easily.

In each of the above embodiments, the operation device 1 or 1A including the wearing member 2 is worn on one hand of the user US. However, this is not limitative, and the wearing site of the wearing member on the user US is not limited insofar as the wearing member is worn on part of the body of the user US.

In each of the above embodiments, the wearing member 2 is constituted the operation device 1 or 1A that transmits operation information according to an operation by the user US. However, this is not limitative, and the wearing member 2 may be adopted as one by which an object used while worn on the body of the user US is worn on the body of the user US. In other words, the configuration of the object including the wearing member 2 is not limited.

REFERENCE SIGNS LIST (1L, 1R), 1A (1LA, 1RA): Operation device
2: Wearing member
22: Detection section (Operation section)
23: Input section (Operation section)
25: Communication section (Transmission section)
30: Housing
31: Support member
32: First biasing member
33: Sliding member
333: Contact section (Part of sliding member)
34: Belt
343: Contractible-extendable section
35: Hinge
36: Second biasing member
37: Contact member
38, 38A: Take-up mechanism (Locking section)
381, 381A: Reel
3813: Anti-slip section
4: Cradle
5: Take-up device
5L: Take-up device (Left take-up device)
5R: Take-up device (Right take-up device)
6: Housing
614: Detection section
622: Disposing section
624: Releasing section
63: Rising mechanism
7: Driving section
71: Motor
72: Frame
73: Transmission mechanism
74: Roller
81: Feeding section
82: Communication section
83: Control section
LH: Left hand (One hand)
RH: Right hand (One hand)
SP: Space
US: User

The invention claimed is:

1. A wearing member comprising:
a support member that extends in a first direction;
a belt that extends from a site in the first direction of the support member;
a sliding member that is connected to one end of the belt and slides in the first direction along the support member; and
a locking section located at an end of the support member opposite to the first direction in relation to the support ember and locks a site on the other end side of the belt,
wherein, in a state in which the belt is locked by the locking section, a space surrounded by the support member and the belt is formed, and
a part of the sliding member is disposed inside the space.

2. The wearing member according to claim 1, further comprising:
a take-up mechanism located at the end of the support member opposite to the first direction in relation to the support member and takes up a site on the other end side of the belt,
wherein the locking section is the take-up mechanism.

3. The wearing member according to claim 2,
wherein the take-up mechanism has a reel for taking up the belt, and
the reel is exposed on an outside of a housing.

4. The wearing member according to claim 3,
wherein the take-up mechanism has an anti-slip section that is located at a circumferential surface of the reel.

5. The wearing member according to claim 1, further comprising:
a first biasing member that biases the sliding member in a direction opposite to the first direction.

6. The wearing member according to claim 1,
wherein the wearing member is worn on one hand of a user,
the support member is disposed on a palm side of the one hand, and
the belt extends from the support member and is disposed along a back of the one hand.

7. The wearing member according to claim 6, further comprising:
a hinge that is connected to a site in the first direction of the support member;
a contact member through which the belt is passed, the contact member being connected to the hinge and making contact with the back of the one hand; and
a second biasing member that biases the hinge in a direction for enlarging diameter of the space surrounded by the support member, the hinge, the contact member, and the belt.

8. The wearing member according to claim 7,
wherein the contact member is wider than the belt.

9. The wearing member according to claim 1,
wherein the belt has a contractible-extendable section that is contractible and extendable along the belt.

10. The wearing member according to claim 1, further comprising:
an operation section that accepts an input operation; and
a transmission section that transmits operation information according to the input operation.

* * * * *